(12) United States Patent
Jo et al.

(10) Patent No.: US 11,806,704 B2
(45) Date of Patent: Nov. 7, 2023

(54) AMMONIA MEMBRANE REACTOR COMPRISING A COMPOSITE MEMBRANE

(71) Applicant: KOREA INSTITUTE OF SCIENCE AND TECHNOLOGY, Seoul (KR)

(72) Inventors: Young Suk Jo, Seoul (KR); Chang Won Yoon, Seoul (KR); Hyuntae Sohn, Seoul (KR); Hyangsoo Jeong, Seoul (KR); Seong Cheol Jang, Seoul (KR); Yeong Cheon Kim, Seoul (KR); Jonghee Han, Seoul (KR); Suk Woo Nam, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 17/859,485

(22) Filed: Jul. 7, 2022

(65) Prior Publication Data
US 2022/0347644 A1 Nov. 3, 2022

Related U.S. Application Data

(63) Continuation of application No. 16/719,991, filed on Dec. 19, 2019, now Pat. No. 11,465,114.

(30) Foreign Application Priority Data

Dec. 19, 2018 (KR) .......................... 10-2018-0165479

(51) Int. Cl.
*B01J 8/02* (2006.01)
*B01J 19/24* (2006.01)
(Continued)

(52) U.S. Cl.
CPC ......... *B01J 8/0278* (2013.01); *B01J 19/2475* (2013.01); *B01J 23/10* (2013.01);
(Continued)

(58) Field of Classification Search
CPC ...... B01J 8/0278; B01J 19/2475; B01J 23/10; B01J 23/462; B01J 23/6486; B01J 29/084;
(Continued)

(56) References Cited

U.S. PATENT DOCUMENTS

2002/0021995 A1* 2/2002 Balachandran ...... B01D 53/228
422/177
2002/0141920 A1 10/2002 Alvin
(Continued)

FOREIGN PATENT DOCUMENTS

CN 107249718 A * 10/2017 ........... B01D 63/061
CN 109529865 A * 3/2019 ............ B01J 23/462
(Continued)

OTHER PUBLICATIONS

F.R. Garcia-Garcia et al., "High purity hydrogen production by low temperature catalytic ammonia decomposition in a multifunctional membrane reactor," Catalysis Communications, 2008, pp. 482-486, vol. 9, Elsevier B.V.

(Continued)

*Primary Examiner* — Kaity V Chandler
(74) *Attorney, Agent, or Firm* — CANTOR COLBURN LLP

(57) ABSTRACT

The present specification discloses a membrane reactor comprising a reaction region; a permeate region; and a composite membrane disposed at a boundary of the reaction region and the permeate region, wherein the reaction region comprises a bed filled with a catalyst for dehydrogenation reaction, wherein the composite membrane comprises a support layer including a metal with a body-centered-cubic (BCC) crystal structure, and a catalyst layer including a palladium (Pd) or a palladium alloy formed onto the support layer, wherein ammonia ($NH_3$) is supplied to the reaction (Continued)

region, the ammonia is converted into hydrogen ($H_2$) by the dehydrogenation reaction in the presence of the catalyst for dehydrogenation reaction, and the hydrogen permeates the composite membrane and is emitted from the membrane reactor through the permeate region.

17 Claims, 21 Drawing Sheets

(51) Int. Cl.
| | |
|---|---|
| B01J 23/46 | (2006.01) |
| B01J 23/10 | (2006.01) |
| B01J 29/08 | (2006.01) |
| B01J 35/04 | (2006.01) |
| B01J 35/00 | (2006.01) |
| C01B 3/04 | (2006.01) |
| H01M 8/0606 | (2016.01) |
| B01J 23/648 | (2006.01) |

(52) U.S. Cl.
CPC ......... *B01J 23/462* (2013.01); *B01J 23/6486* (2013.01); *B01J 29/084* (2013.01); *B01J 35/0006* (2013.01); *B01J 35/04* (2013.01); *C01B 3/047* (2013.01); *H01M 8/0606* (2013.01); *B01J 2208/00884* (2013.01); *B01J 2208/00973* (2013.01)

(58) Field of Classification Search
CPC ............ B01J 35/0006; B01J 35/04; B01J 2208/00884; B01J 2208/00973; B01J 2208/00672; B01J 2208/00805; B01J 8/009; B01J 8/0292; B01J 23/44; B01J 35/065; B01J 37/0201; B01J 37/088; B01J 37/16; B01J 29/068; B01J 29/123; B01J 29/126; B01J 29/44; B01J 2208/027; C01B 3/047; C01B 2203/066; C01B 2203/1064; C01B 3/503; C01B 2203/0277; H01M 8/0606; B01D 53/228; B01D 2256/16; B01D 2258/0208; B01D 71/022; B01D 71/024; Y02E 60/36; Y02E 60/50

See application file for complete search history.

(56) References Cited

U.S. PATENT DOCUMENTS

| | | | |
|---|---|---|---|
| 2004/0129135 A1* | 7/2004 | Roark | C04B 35/50 |
| | | | 95/55 |
| 2006/0112636 A1* | 6/2006 | Chellappa | H01M 16/006 |
| | | | 423/658.2 |
| 2009/0257928 A1* | 10/2009 | Jia | B01J 3/008 |
| | | | 422/187 |
| 2010/0266929 A1 | 10/2010 | Kanemoto | |
| 2013/0136666 A1 | 5/2013 | Park | |
| 2013/0206002 A1 | 8/2013 | Park et al. | |
| 2016/0096151 A1* | 4/2016 | Serra | C04B 35/495 |
| | | | 422/187 |
| 2019/0039887 A1* | 2/2019 | Li | C01B 3/047 |

FOREIGN PATENT DOCUMENTS

| | | | | |
|---|---|---|---|---|
| JP | 2013095618 A | * | 5/2013 | |
| KR | 10-20010018853 A | | 3/2001 | |
| KR | 10-20150018923 A | | 2/2015 | |
| KR | 20160031874 A | * | 3/2016 | ............ B01J 23/10 |
| KR | 20160031874 A | | 3/2016 | |
| WO | 2004022480 A2 | | 3/2004 | |
| WO | 2008133718 A2 | | 11/2008 | |
| WO | 2015020503 A1 | | 2/2015 | |

OTHER PUBLICATIONS

Gang Li et al., "Ammonia Decomposition in Catalytic Membrane Reactors: Simulation and Experimental Studies," AIChE Journal, Jan. 2013, pp. 168-179, vol. 59, No. 1, American Institute of Chemical Engineers.
Jian Zhang et al., "High-purity COx-free H2 generation from NH3 via the ultra permeable and highly selective Pd membranes," Journal of Membrane Science, 2006, pp. 85-93, vol. 277.
John P. Collins et al., "Catalytic decomposition of ammonia in a membrane reactor," Journal of Membrane Science, 1994, pp. 259-274, vol. 96, Elsevier Science B.V.
Krystina E. Lamb et al., "High-Purity H2 Produced from NH3 via a Ruthenium-Based Decomposition Catalyst and Vanadium-Based Membrane," Industrial & Engineering Chemistry Research, 2018, pp. 7811-7816, vol. 57, American Chemical Society.
Young Suk Jo et al., "A viable membrane reactor option for sustainable hydrogen production from ammonia," Journal of Power Sources, 2018, pp. 518-526, vol. 400.

* cited by examiner

AMMONIA MEMBRANE REACTOR COMPRISING A COMPOSITE MEMBRANE

CROSS-REFERENCE TO RELATED APPLICATION

This application claims priority to U.S. patent application Ser. No. 16/719,991 filed Dec. 19, 2019, which in turn claims priority to Korean Patent Application No. 10-2018-0165479, filed on Dec. 19, 2018, and all the benefits accruing therefrom under 35 U.S.C. §§ 119, 120, the contents of which in their entirety are herein incorporated by reference.

DESCRIPTION ABOUT NATIONAL SUPPORT RESEARCH AND DEVELOPMENT

This study was supported by following national research project:
Ministry of Trade, Industry and Energy, Republic of Korea (Development of hydrogen production/purification system through decomposition of ammonia ($NH_3$), Project No. 1415159445) under the superintendence of CES Co., Ltd.

BACKGROUND OF THE INVENTION

Field of the Invention

The present specification discloses a membrane reactor comprising a composite membrane.

Description of the Related Art

As climate change intensifies and global energy demand increases, the demand for renewable energy solutions has also increased. As one of the eco-friendly and sustainable energy, hydrogen is expected to be an efficient energy carrier because it only emits $H_2O$ as a byproduct when used in conjunction with a fuel cell. However, hydrogen has low volumetric energy density, requiring physical or chemical storage methods. Conventional hydrogen storage methods (compressed or liquefied) increase physical density of hydrogen by applying high pressure or low temperature, but these still have low volumetric hydrogen density and requires energy to change physical state of hydrogen. In particular, as a hydrogen carrier, ammonia has a high hydrogen storage capacity (17.6 wt. %, 120 g/L$^{-1}$), and has the advantage of being easy to be stored and transported as it can be liquefied at a pressure of 8 bar or less and at room temperature.

Conventionally, a method for producing hydrogen through thermochemical ammonia decomposition ($2NH_3 \rightarrow N_2 + 3H_2$) using a heterogeneous catalyst (for example, ruthenium) has been established. However, in order to obtain a high ammonia conversion of 90% or more using the conventional method, a high reaction temperature of 500° C. or more is required, and a miniscule amount of ammonia is included in the product even with a highly active catalyst. Ammonia adversely affects fuel cell performance when even a small amount of ammonia is included in a hydrogen supplied to a proton exchange membrane fuel cell (PEMFC). Therefore, it goes through a purification step prior to supplying the produced hydrogen to a fuel cell, but this makes the process complicated. In addition, there is a problem that the pressurized reaction is not thermodynamically favorable so that the volume of the reactor needs to be increased.

In order to solve the aforementioned problems, there has been a method of forming a membrane on a porous support (palladium or silica on alumina), but there is a limitation that this method has a low hydrogen selectivity and is highly dependent on reactor operation. In addition, since the PEMFC deteriorates even at low ammonia concentrations such as about 13 ppm over long periods of operation, this is not suitable for use in fuel cell systems. Further, a hydrogen permeable palladium (Pd) membrane formed on a porous support has a problem that a compromise is required between the thickness (cost) and the hydrogen selectivity (purity) of the membrane because it is difficult to produce a thin hydrogen permeable membrane and the hydrogen selectivity is also reduced due to the decrease in thickness.

On the other hand, there is also a method of obtaining high hydrogen permeability and selectivity by using a metal catalyst with a body-centered-cubic (BCC) structure having a thin catalyst palladium (Pd) layer. However, such a Pd/BCC composite catalyst has a disadvantage in aspect of hydrogen embrittlement and durability.

SUMMARY OF THE INVENTION

The membrane reactor according to the embodiment of the present invention is intended to solve the problem that the conventional hydrogen membrane has low hydrogen selectivity such that it requires a separate ammonia purification device when applied to fuel cell systems, which makes the process step complicated.

The membrane reactor according to the embodiment of the present invention is intended to solve the problem that the conventional ammonia dehydrogenation reactor has a large volume of the reactor because the pressurized reaction is not favorable in terms of thermodynamics.

The membrane reactor according to the embodiment of the present invention is intended to solve the problems of hydrogen embrittlement that the Pd/BCC composite membrane has at low operating temperature and durability issue that Pd/BCC composite membrane has at high operating temperature.

In one embodiment of the present invention, the present invention provides a membrane reactor comprising a reaction region; a permeate region; and a composite membrane disposed at a boundary of the reaction region and the permeate region, wherein the reaction region comprises a bed filled with a catalyst for dehydrogenation reaction, wherein the composite membrane comprises a support layer including a metal with a body-centered-cubic (BCC) crystal structure, and a catalyst layer including a palladium (Pd) or a palladium alloy formed onto the support layer, wherein ammonia ($NH_3$) is supplied to the reaction region, the ammonia is converted into hydrogen ($H_2$) by the dehydrogenation reaction in the presence of the catalyst for dehydrogenation reaction, and the hydrogen permeates the composite membrane and is emitted from the membrane reactor through the permeate region.

In one embodiment, the surface of the support layer may be in contact with the reaction region, and the surface of the catalyst layer may be in contact with the permeate region.

In one embodiment, the metal with the body-centered-cubic (BCC) crystal structure may include one or more of vanadium (V), niobium (Nb), and Tantalum (Ta).

In one embodiment, the support layer includes an oxide with catalytic activity and the oxide includes one or more of $V_2O_5$, $Ta_2O_5$, and $Nb_2O_5$.

In one embodiment, the catalyst layer may have a thickness of 0.1 to 5 μm.

In one embodiment, the composite membrane may have hydrogen permeability of $2\times10^{-8}$ mol m$^{-1}$ s$^{-1}$ Pa$^{-0.5}$ to $3\times10^{-7}$ mol m$^{-1}$ s$^{-1}$ Pa$^{-0.5}$.

In one embodiment, the catalyst for dehydrogenation reaction may be a ruthenium-based catalyst or a porous support-based catalyst.

In one embodiment, the catalyst for dehydrogenation reaction includes ruthenium carried on a porous support, wherein the porous support comprises one or more selected from the group consisting of $Al_2O_3$, $SiO_2$, $TiO_2$, $CeO_2$, CuO, MgO, $Nb_2O_3$, $WO_3$, $ZrO_2$, FeO, $La_2O_3$, Activated Carbon, Graphene, and hexagonal Boron nitrides.

In one embodiment, the catalyst for dehydrogenation reaction may be impregnated with ruthenium in an amount of 0.1-10.0 wt. % with respect to porous support.

In one embodiment, the porous support-based catalyst may include ruthenium (Ru) carried on a metal-doped zeolite, wherein the metal may include one or more selected from the group consisting of sodium (Na), potassium (K), rubidium (Rb) and cesium (Cs), and the zeolite may include one or more selected from the group consisting of X zeolite, Y zeolite, ZSM-5 zeolite, beta zeolite, L zeolite, A zeolite, $Al_2O_3$, $SiO_2$, $TiO_2$, $CeO_2$, CuO, MgO, $Nb_2O_3$, $WO_3$, $ZrO_2$, FeO, $La_2O_3$, activated carbon, graphene, and hexagonal boron nitrides.

In one embodiment, the purity of hydrogen emitted from the membrane reactor may be 99.999% or more.

In one embodiment, the operating temperature of the membrane reactor may be 400 to 500° C., and the operating pressure in the reaction region may be 1 to 10 bar.

In one embodiment, the sweep gas may be further supplied to the permeate region of the membrane reactor.

In one embodiment, the sweep gas may be supplied at the flow rate of less than 50% of the volumetric flowrate of the hydrogen emitted from the membrane reactor through the permeate region.

In one embodiment, the membrane reactor may further comprise a reinforcement insert, wherein the reinforcement insert may be disposed at an end of the composite membrane.

In another embodiment of the present invention, the present invention provides a hydrogen fuel cell system comprising the membrane reactor according to the embodiment of the present invention; and a hydrogen fuel cell, wherein hydrogen emitted from the membrane reactor is directly supplied to the fuel cell.

DETAILED DESCRIPTION OF THE PREFERRED EMBODIMENTS

Figure 1:
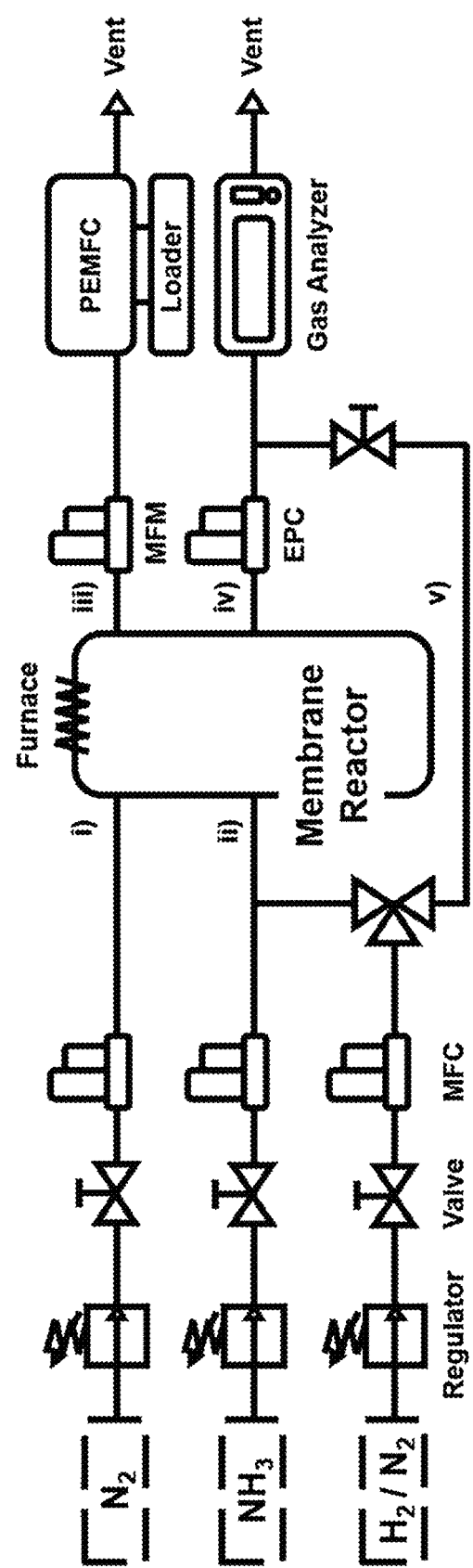
FIG. 1 illustrates a schematic diagram of a hydrogen fuel cell system according to the embodiment of the present invention.

Hereinafter, embodiments of the present invention will be explained in more detail.

Herein, "conversion" is defined as the flow rate of $NH_3$ which is converted into nitrogen and hydrogen per volume feed speed of $NH_3$ supplied to the reactor.

In the present specification, "$H_2$ recovery" is defined as a volume of $H_2$ that penetrates into the membrane per the flow rate of $H_2$ which was produced as the dehydrogenation reaction of $NH_3$.

In the present specification, "sweep gas" refers to gas that carries hydrogen gas, which is the product in the permeate region, to the outside of the reactor.

In one embodiment of the present invention, the present invention provides a membrane reactor comprising a reaction region; a permeate region; and a composite membrane disposed at a boundary of the reaction region and the permeate region, wherein the composite membrane comprises a support layer including a metal with a body-centered-cubic (BCC) crystal structure, and a catalyst layer including a palladium (Pd) or a palladium alloy formed onto the support layer, wherein ammonia ($NH_3$) is supplied to the reaction region, the ammonia is converted into hydrogen ($H_2$) by the dehydrogenation reaction in the presence of the catalyst for dehydrogenation reaction, and the hydrogen permeates the composite membrane and is emitted from the membrane reactor through the permeate region.

Hydrogen Membrane

In one embodiment, the composite membrane may comprise a support layer including a metal with a body-centered-cubic (BCC) crystal structure, and a catalyst layer including a palladium (Pd) or a palladium alloy formed onto the support layer. For example, the catalyst layer may be coated on the support layer.

In one embodiment, the surface of the support layer may be in contact with the reaction region, and the surface of the catalyst layer may be in contact with the permeate region.

Palladium is Group V metal. Generally, it has been known that the $H_2$ permeability of a Group V metal composite membrane decreases as a temperature increases; however, the accurate mechanism of the membrane fouling phenomenon has not been found, and it is just assumed that this may be caused by an interaction between a catalyst layer (Pd) and a bulk diffusion layer (Ta). In this connection, at a high temperature, a hydrogen flux of a Group Pd/Group V metal membrane may be reduced, and it is assumed that this is caused mainly by a surface diffusion in Pd and a fine structural change of Pd coating. In particular, it has been known that since Group V metal has hydrogen embrittlement at a low temperature, it is difficult to operate it stably for long periods at a low temperature of 400° C. or less.

In one embodiment, the metal with a body-centered-cubic (BCC) crystal structure may include one or more of vanadium (V), niobium (Nb), and Tantalum (Ta).

In one embodiment, the support layer may include an oxide with catalytic activity. Specifically, the oxide may includes one or more of $V_2O_5$, $Ta_2O_5$, and $Nb_2O_5$.

The support layer may play a role of diffusing reaction gas into the catalyst layer so as to facilitate the reaction gas to access to the catalyst layer, while supporting the catalyst layer.

In one embodiment, the coating may be made according to one or more coating methods selected from the group consisting of sputtering, an electron beam evaporation method, a physical vapor deposition (PVD) method, a chemical vapor deposition (CVD) method, an organic chemical vapor deposition (MOCVD) method, a plasma assisted chemical vapor deposition (PACVD) method, electroplating and electroless plating, and for example, any method can be applied, without any particular limitation, as long as palladium (Pd) is deposited while maintaining its crystal.

In one embodiment, the surface of the support layer may be in contact with the reaction region, and the surface of the catalyst region may be in contact with the permeate region.

In one embodiment, the catalyst layer may have a thickness of 0.1 to 5 μm. If the thickness is less than 0.1 μm, a sufficient hydrogen conversion cannot be assured, and if the thickness exceeds 5 μm, the hydrogen permeability may not be good, and it would be economically infeasible because of the use of a large amount of expensive catalysts, e.g., palladium.

In one embodiment, the composite membrane may have the hydrogen permeability of $2 \times 10^{-8}$ mol m$^{-1}$ s$^{-1}$ Pa$^{-0.5}$ to $3 \times 10^{-7}$ mol m$^{-1}$ s$^{-1}$ Pa$^{-0.5}$.

Catalyst for Dehydrogenation Reaction

In one embodiment, the catalyst for dehydrogenation reaction may be a ruthenium-based catalyst or a porous support-based catalyst.

Lanthanum (La)-Doped Ruthenium-Based Catalyst

In one embodiment, the catalyst for dehydrogenation reaction may be a ruthenium-based catalyst, specifically, a lanthanum (La)-doped ruthenium-based catalyst. Specifically, the lanthanum (La)-doped ruthenium-based catalyst may include ruthenium carried on a porous support.

In one embodiment, the porous support includes one or more selected from the group consisting of $Al_2O_3$, $SiO_2$, $TiO_2$, $CeO_2$, CuO, MgO, $Nb_2O_5$, $WO_3$, $ZrO_2$, FeO, $La_2O_3$, Activated Carbon, Graphene, and hexagonal Boron nitrides.

In one embodiment, the lanthanum (La)-doped ruthenium-based catalyst may be doped with lanthanum, and the lanthanum element on the surface of the doped catalyst may act as a Lewis acid site which helps the absorption of ammonia, thereby promoting the dehydrogenation.

In one embodiment, the lanthanum (La)-doped ruthenium-based catalyst may be doped with 1-50 mol % of lanthanum with respect to the porous support. If it is doped with less than 1 mol % of lanthanum with respect to the porous support, the catalyst activity may not be sufficient, and if it is doped with more than 50 mol % of lanthanum, efficiency would decrease because an increase of the catalyst activity according to the La doping would be low. For example, if it is doped with more than 20 mol % of lanthanum, the catalyst activity may be reduced because a reduction of the surface area is more significant as compared to an increase in electron density and an increase in acid site of the catalyst surface induced by the La doping.

In one embodiment, the lanthanum (La)-doped ruthenium-based catalyst may be impregnated with ruthenium.

In one embodiment, the lanthanum (La)-doped ruthenium-based catalyst may be impregnated with ruthenium in the amount of 0.1-10.0 wt. % with respect to the porous support.

In one embodiment, due to an increase in electron density of ruthenium caused by an electronic interaction between the impregnated ruthenium and the doped lanthanum, the activity of the catalyst may be increased.

In one embodiment, the catalyst may be a pellet-type catalyst. In order to apply the membrane reactor to a practical size of a system, in consideration of the load pressure inside the reactor, a pellet-type catalyst may be more suitable than a powder-type catalyst. However, since the pellet catalyst has a low surface area per unit mass as compared to the power catalyst, it has relatively low conversion efficiency as compared to the power catalyst, and this adversely effects fuel cells which are less resistant to the ammonia concentration. For this reason, a pellet-type catalyst having a high conversation rate is advantageous. In one embodiment, the lanthanum (La)-doped ruthenium-based catalyst may have one or more properties of i) a surface area of 10-200 $m^2\ g^{-1}$, ii) a pore size of 0.1-1.0 $cm^3\ g^{-1}$, and iii) a pore diameter of 100-200 Å of a pore diameter.

Specifically, the surface area may be in the range of 20-190 $m^2\ g^{-1}$, 30-180 $m^2\ g^{-1}$, 40-170 $m^2\ g^{-1}$, 50-160 $m^2\ g^{-1}$, 60-150 $m^2\ g^{-1}$, 70-140 $m^2\ g^{-1}$, 80-130 $m^2\ g^{-1}$, or 90-120 $m^2\ g^{-1}$, and when applied to the membrane reactor according to the embodiment of the present invention within said ranges, the activity of the lanthanum (La)-doped ruthenium-based catalyst can be maximized.

The pore size may be in the range of 0.2-0.9 $cm^3\ g^{-1}$, 0.3-0.8 $cm^3\ g^{-1}$, 0.4-0.7 $cm^3\ g^{-1}$, or 0.5-0.6 $cm^3\ g^{-1}$, and when applied to the membrane reactor according to the embodiment of the present invention within said ranges, the activity of the lanthanum (La)-doped ruthenium-based catalyst can be maximized.

The pore diameter may be in the range of 110-190 Å, 120-180 Å, 130-170 Å, or 140-160 Å, and when applied to the membrane reactor according to the embodiment of the present invention within said ranges, the activity of the lanthanum (La)-doped ruthenium-based catalyst can be maximized.

In one embodiment, Ru may be carried on a metal-doped porous support by reacting the metal-doped porous support and a Ru precursor and then heat treating it.

In the exemplary embodiment, the Ru precursor may be one or more selected from the group consisting of materials including chloride, organic, and inorganic materials. For example, the Ru precursor may include $RuCl_3$, $RuCl_3XH_2O$, $RuCl_3 \cdot 3H_2O$, $[Ru(NH_3)_6]Cl_3$, $[Ru(NH_3)_6]Cl_2$, $Ru(C_5H_7O_2)_3$ $Ru_3(CO)_{12}$, $C_{16}H_{22}O_2Ru$, $C_{18}H_{26}Ru$ etc.

Porous Support-Based Catalyst

In one embodiment, the catalyst for dehydrogenation reaction may be a porous support-based catalyst, and may be a catalyst for ammonia dehydrogenation, including ruthenium (Ru; hereinafter, referred to as Ru) carried on a metal-doped porous support.

Generally, there is a constant tendency between the extent that electrons are filled in a D-band of metal and adsorption energy of nitrogen and metal, and this also has a tendency with efficiency of ammonia dehydrogenation. Specifically, the more electrons are filled in the D-band, the lower the adsorption energy of the catalyst (metal) and nitrogen is, and the smaller the electrons are filed in the D-band, the stronger the adsorption energy of the catalyst (metal) and nitrogen is. Among them, when Ru is used as a catalyst, it has the minimum nitrogen adsorption energy, but it is not considered optimal. Accordingly, the embodiment of the present invention is intended to fill electrons in the D-band of Ru using certain metals to have the optimum nitrogen binding energy, thereby increasing the ammonia dehydrogenation activity.

That is, in the porous support-based catalyst, a metal having a relatively low electronegativity compared to Ru is doped onto the support to easily provide electrons to Ru. Thereby, the efficiency can be maximized when used in the dehydrogenation reaction of ammonia.

In the exemplary embodiment, the metal may be metal having an electronegativity in the range of 0.5 to 1, and may be, for example, one or more metals selected from the group consisting of sodium (Na), potassium (K), rubidium (Rb) and cesium (Cs).

In one embodiment, the porous support includes one or more selected from the group consisting of $Al_2O_3$, $SiO_2$, $TiO_2$, $CeO_2$, $CuO$, $MgO$, $Nb_2O_3$, $WO_3$, $ZrO_2$, $FeO$, $La_2O_3$, Activated Carbon, Graphene, and hexagonal Boron nitrides.

In one embodiment, the porous support-based catalyst may be a zeolite-based catalyst. The zeolite-based catalyst can be represented by the following formula.

Ru/X-Zeolite [Formula 1]

wherein in the formula 1, X may be selected from the group consisting of Na, K, Rb, and Cs.

In one embodiment, the metal may be Cs.

On the other hand, the metal may be doped at a weight ratio of 1% to 50% with respect to the total weight of the porous support, and specifically, may be doped at a ratio of 5 to 40% and 10 to 30%. If the metal is doped at a ratio of less than 1%, the performance improvement according to doping of the metal cannot be expected, and if the metal is doped at a ratio of more than 50%, the non-surface area where Ru can be carried would be less and thus the catalyst activity may be deteriorated.

Meanwhile, zeolite is used as a support of the catalyst for dispersing Ru for dispersion of a catalyst and preventing sintering.

In the exemplary embodiment, the type of zeolite is not limited if the zeolite is capable of various ion exchanges, and for example, X zeolite, Y zeolite, ZSM-5 zeolite, Beta zeolite, L zeolite, A zeolite, etc. can be used.

Meanwhile, Ru can be carried on a metal-doped porous support by reacting the metal-doped porous support and a Ru precursor and then heat treating it.

In the exemplary embodiment, the Ru precursor may be one or more selected from the group consisting of materials including chloride, organic, and inorganic materials. For example, the Ru precursor may include $RuCl_3$, $RuCl_3XH_2O$, $RuCl_3 \cdot 3H_2O$, $[Ru(NH_3)_6]Cl_3$, $[Ru(NH_3)_6]Cl_2$, $Ru(C_5H_7O_2)_3$ $Ru_3(CO)_{12}$, $C_{16}H_{22}O_2Ru$, $C_{18}H_{26}Ru$ etc.

In the exemplary embodiment, Ru may be carried at a weight ratio of 0.1 to 10% with respect to the total weight of the metal-doped porous support, and specifically, it may be carried at a weight ratio of 3 to 7%. If Ru is carried at a ratio of less than 0.1%, the performance improvement cannot be expected, and if Ru is carried at a ratio of more than 10%, an aggregation between Rus occurs, which rather causes the deterioration of catalyst performance.

In one embodiment, the porous support-based catalyst may have a size of 0.5 nm to 20 nm, and specifically, may have a size of about 1 nm to 10 nm. If the porous support-based catalyst has the size in said range, the catalyst activity may be most excellent.

As aforementioned above, according to the porous support-based catalyst, the metal may provide sufficient electron density to Ru. Specifically, the metal may provide electrons to the active region of Ru in the porous support-based catalyst. Thereby, the electron density in the active region of Ru may increase, which results in increasing the catalyst activity of the porous support-based catalyst and improving thermal stability and durability.

For example, the porous support-based catalyst may have an ammonia conversion in the range of about 70 to 99.9%. In particular, the porous support-based catalyst may have an ammonia conversion in the range of 78 to 99% at temperatures in the range of 550 to 600° C., and more specifically, may have an ammonia conversion of 85 to 99% at temperatures in the range of 550 to 600° C. The specific ammonia conversion, however, may vary depending on detailed operating conditions when applied to the reactor.

Meanwhile, the Ru precursor, metal and porous support, used for the preparation of the porous support-based catalyst, can be purchased at low prices. Accordingly, if the porous support-based catalyst is prepared using the Ru precursor, metal and porous support, such as zeolite, etc., the porous support-based catalyst can be produced at an economic cost and in large quantities. Thereby, the production price of the process can be lowered.

Membrane Reactor

In one embodiment of the present invention, the present invention provides a membrane reactor comprising a reaction region; a permeate region; and a composite membrane disposed at a boundary of the reaction region and the permeate region, wherein the reaction region comprises a bed filled with a catalyst for dehydrogenation reaction, wherein ammonia ($NH_3$) is supplied to the reaction region, the ammonia is converted into hydrogen ($H_2$) by the dehydrogenation reaction in the presence of the catalyst for dehydrogenation reaction, and the hydrogen permeates the composite membrane and is emitted from the membrane reactor through the permeate region.

In one embodiment, the purity of the hydrogen emitted from the membrane reactor may be 99.999% or more, for example, 99.9999% or more. If the purity of the hydrogen is less than 99.999%, it is impossible to be directly connected to a fuel cell, and a purification device is needed. In addition, if it is directly connected without purifying ammonia, there would be a problem that a palladium layer having a thick thickness, for example, a thickness of about 10 μm, in the hydrogen membrane, is needed.

Accordingly, since the membrane reactor according to the embodiment of the present invention has the excellent purity of the emitted hydrogen, the membrane reactor, which uses the pressurized decomposition process, can be applied in the field of power generation application without a separate $NH_3$ purification device, and thus, a small-scale power generation in the field can be induced when applied to hydrogen fuel cell systems.

In one embodiment, instead of the reaction region, the permeate region may comprise a bed filled with a catalyst for dehydrogenation reaction.

In one embodiment, the operating temperature of the membrane reactor may be in the range of 350 to 550° C. Specifically, the operating temperature of the membrane reactor may be no less than 350 and not more than 550° C. If the operating temperature is less than 350° C., durability may not be good since Ta may have hydrogen embrittlement, and if the operating temperature exceeds 550° C., durability may not be good due to an inter-diffusion between the Pd layer and the Ta layer.

Preferably, in case where the ammonia dehydrogenation reaction is performed through the Pd/Ta composite membrane at the membrane reactor operating temperature in the range of 400 to 450° C., the $NH_3$ dehydrogenation reaction can be applied without problems related to durability of the Pd/Ta hydrogen membrane.

In one embodiment, the membrane reactor may be operated at an atmospheric pressure, and it is also possible to operate the reactor under pressure. Specifically, the operating pressure of the membrane reactor, for example the operating pressure in the reaction region, may be 1 to 10 bars or 5 to 10 bars. The operating pressure may be preferably 7 to 8 bars. If the operating pressure is less than 1 bar, the flow rate of the hydrogen permeated may be less, so the dehydrogenation reaction rate may be slow, and if the operating pressure exceeds 10 bar, the membrane may be broken depending on stress. In addition, due to the pressurized reaction, the reactor volume may be designed smaller, and a small-scale power generation in the field can be induced when applied to hydrogen fuel cell systems.

Generally, according to the Le Chatelier's principle, it is not advisable to increase the ammonia pressure; however, it has been found that since the partial pressure of the hydrogen produced by the dehydrogenation reaction is proportional to the amount of the hydrogen absorbed, the dehydrogenation reaction speed is limited as the hydrogen is absorbed to the catalyst. Therefore, increasing the supply pressure of ammonia to the above range has a negative effect on the decomposition equilibrium of ammonia, but has a positive effect on the reaction speed, resulting in an increase in the flow rate of $H_2$ that passes through the membrane.

In one embodiment, ammonia supplied to the reaction region may be supplied at a flow rate of 100 to 6000 GHSV (mL_$NH_3$ $g_{cat}^{-1}$ $min^{-1}$).

In one embodiment, the sweep gas may be further supplied to the permeate region of the membrane reactor.

The sweep gas helps the hydrogen transport to maximize the hydrogen concentration in the permeate region.

In one embodiment, the sweep gas may comprise one or more selected from the group consisting of $N_2$, steam ($H_2O$), argon, He, $H_2$, and ethanol. Preferably, the sweep gas may be $N_2$.

In one embodiment, the sweep gas may be supplied at a flow rate of less than 50% of the volumetric flowrate of the hydrogen emitted from the membrane reactor through the permeate region.

In one embodiment, the sweep gas may be supplied at a flow rate of 30 to 200 $cm^3$ $min^{-1}$.

In one embodiment, the membrane reactor may further comprise a reinforcement insert, wherein the reinforcement insert may be disposed at an end of the composite membrane to prevent material failure by embrittlement. For example, the reinforcement insert may be a sealing part.

For example, it has been known that the Group Pd/V metal composite membrane, for example, Pd/Ta composite membrane may have hydrogen embrittlement at a low temperature, for example, a low temperature range of 450° C. or less, and due to this property, mechanical defects may occur in the hydrogen membrane, and thereby, it is generally hard to obtain stability over long periods of operation. In particular, it has been known that such defects occur mainly at the sealing part located at an end of the hydrogen membrane. The reinforcement insert may help to alleviate mechanical stress acting on the sealing part.

In one embodiment, the membrane reactor may further comprise the reinforcement insert, such that the hydrogen membrane can be operated without any mechanical defects even under the conditions of a high pressure difference and a low temperature of 350° C. Accordingly, it can be verified that the membrane reactor according to the embodiment of the present invention has excellent durability.

Hydrogen Fuel Cell System

Hereinafter, the hydrogen fuel cell system according to the embodiment of the present invention will be explained with reference to FIG. 1

In another embodiment of the present invention, the present invention provides a hydrogen fuel cell system comprising the membrane reactor according to the embodiment of the present invention; and a hydrogen fuel cell, wherein hydrogen emitted from the membrane reactor is directly supplied to the fuel cell.

In one embodiment, the membrane reactor may have a high purity of the hydrogen emitted, such as a hydrogen purity of 99.999% or more, for example, 99.9999% or more, and thereby, it is possible to be directly connected to a fuel cell while not increasing the palladium layer thickness of the hydrogen membrane, and can be applied to a hydrogen fuel cell system with no separate ammonia purification device.

Accordingly, since the membrane reactor according to the embodiment of the present invention has excellent purity of the emitted hydrogen, the membrane reactor, which uses the pressurized decomposition process, can be applied in the field of power generation application, without a separate $NH_3$ purification device.

In one embodiment, the sweep gas may be recirculated from the discharge gas of the fuel cell, which results in increasing efficiency of the hydrogen fuel cell system.

In one embodiment, the hydrogen fuel cell may be PEMFC.

Hereinafter, the constitution and effect of the embodiment of the present invention will be explained in more detail with reference to the examples. However, it should be noted that these examples are provided only for the purpose of examples in order to help the understanding of the embodiment of the present invention, and the scope and range of the present application are not limited to the following examples.

[Example 1] Membrane Reactor (CMR) Comprising a Pd/Ta Membrane

Preparation of Ru/La-AL$_2$O$_3$ Pellet Catalyst

Ruthenium ion (RuCl$_3$·xH$_2$O, 0.189 g, 41.1 wt % Ru, Sigma Aldrich) was stirred and dissolved for 2 hours at room temperature with 18 mL of deionized water. The prepared homogeneous solution was added to 3.0 g of La(x)-Al$_2$O$_3$ pellet support and impregnated with Ru ion for 12 hours at 80° C. Next, the solution was dried for 24 hours at 112° C. The Ru content of Ru/La(20)-Al$_2$O$_3$ prepared was 1.4 wt. %, and this is the value measured by Ion Coupled Plasma-Optical Emission Spectroscopy (ICP-OES).

Preparation of Na—Y Zeolite-Based Catalyst

The ion exchange process was performed on Y zeolite (ACS Material, Y type zeolite, Cation: Na$^+$) for about 20 hours under 70° C., such that zeolite is doped with sodium (Na). Thereafter, the product was dried for about 18 hours under 120° C. and filtered to prepare a sodium (Na)-doped zeolite.

Pd/Ta Composite Membrane

Ta tube (>99.95%; Koralco) with an outer diameter of 6.35 mm, a total length of 125 mm and a thickness of 0.25 mm was used, and the effective permeate area was 25.2 cm$^2$. Na$_3$PO$_4$·12H$_2$O (98-102%, Alfa Aesar), Na$_2$CO$_3$ (>99.0%, Sigma-Aldrich) and NaOH (98%, Daejung Chemicals) were dissolved in deionized water (DI) to prepare a basic wash solution, and an acidic wash solution was prepared with 1M hydrochloric acid (Daejung Chemicals) and 10M phosphoric acid (Daejung Chemicals). The surface was treated with the prepared wash solution, and then Pd was electroless-deposited on Ta by a method of P. P. Mardilovich et., al. (Defect-free palladium membranes on porous stainless-steel support, AIChE J. 44 (2) (1998) 310-322). Herein, SnCl$_2$ (Sigma-Aldrich) and PdCl$_2$ (Sigma-Aldrich), which were dissolved in the DI water, were used as activation solutions, and tetraammine palladium(II) chloride monohydrate (Pd (NH$_3$)$_4$Cl$_2$H$_2$O), which was dissolved in ammonia (Samchun Chemical) with ethylenediaminetetraacetic acid disodium salt dehydrate (EDTA, Sigma-Aldrich), was used as a plating solution. The thickness of Pd on Ta was adjusted depending on the deposition time, and lastly, before testing permeation, it was heat-treated for 2 hours at 500° C. under the N$_2$ condition, such that the Pd layer was well deposited on the Ta surface.

Figure 2:
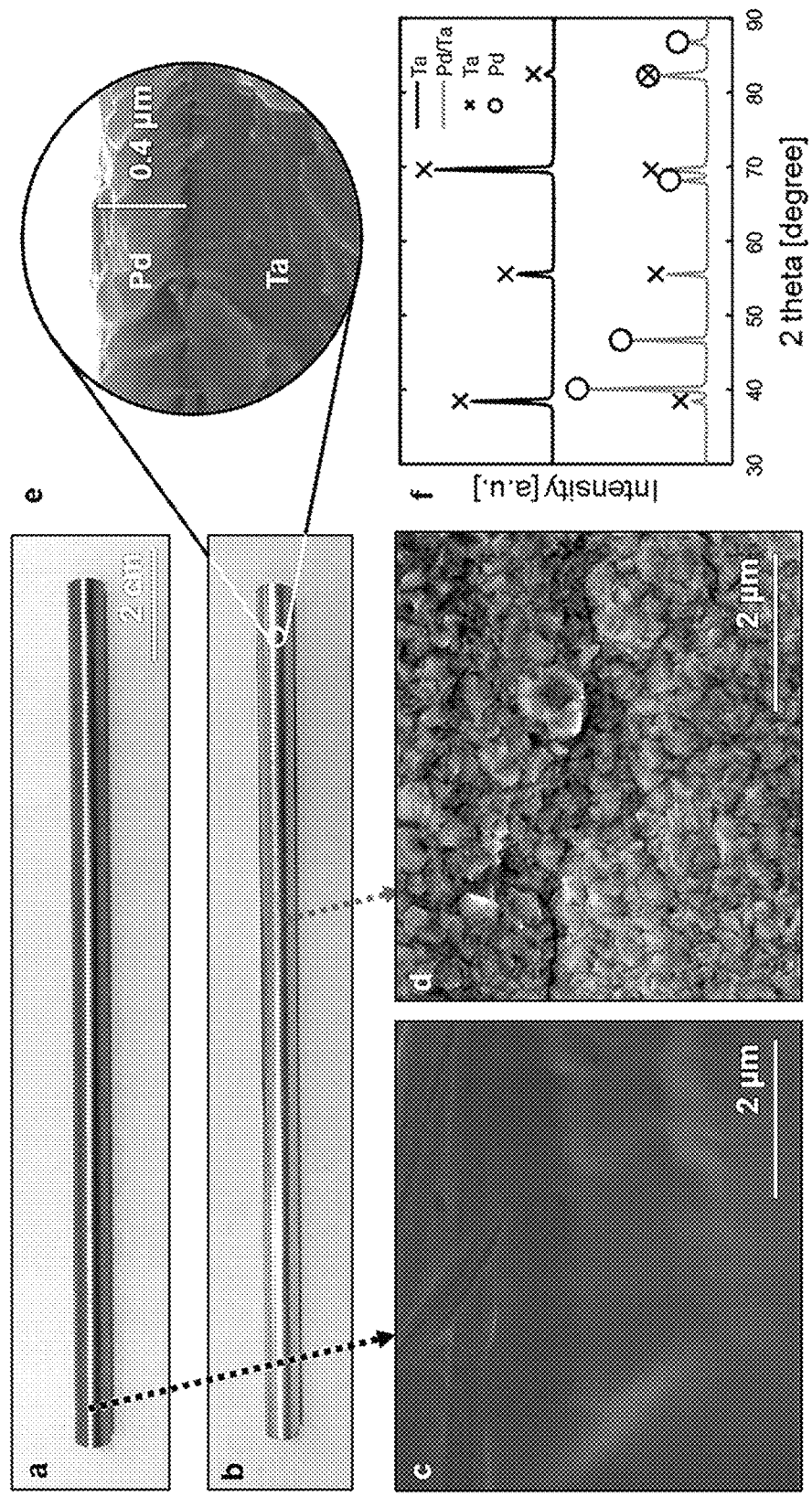
FIG. 2 illustrates the properties of the surface and cross section of the Pd/Ta composite membrane of the membrane reactor according to the embodiment of the present invention.

FIG. 2 shows the surface and cross section of the prepared Pd/Ta composite membrane. It can be verified from the SEM image that the Pd layer was coated with a thickness of about 0.4 μm on the Ta tube. In addition, the structure of the prepared Pd/Ta composite membrane was shown from the micro-XRD pattern of the Ta layer and Pd layer surface.

Membrane Reactor Comprising the Ru/La-AL$_2$O$_3$ Pellet Catalyst and the Pd/Ta Composite Membrane The aforementioned Pd/Ta composite membrane consists of two tubes, wherein the membrane was used as an inner tube, and a SUS tube was used as an external tube. The Ru/La-AL$_2$O$_3$ pellet catalyst was filled between the two tubes to prepare the membrane reactor comprising the Ru/La-AL$_2$O$_3$ pellet catalyst and the Pd/Ta composite membrane.

[Example 2] Membrane Reactor in which a Sealing Insert is Added

The membrane reactor was prepared in the same manner as Example 1, except for further adding a sealing insert at both ends of the tube-type Pd/Ta membrane.

[Comparative Example 1] Reactor (PBR) Comprising No Pd/Ta Membrane

The membrane reactor was prepared in the same manner as Example 1, except that there is no Pd/Ta membrane.

Test Example 1: Performance Analysis of the Hydrogen Membrane

Hydrogen Permeability Analysis

Under the conditions of the reaction temperature of 450° C. and the sweep gas (N$_2$) flow rate of 200 cm$^3$ min$^{-1}$, pure H$_2$ was permeated into the Pd/Ta hydrogen membrane (apparent permeate area was 25.2 cm$^2$) of Example 1 at a pressure of 6.5 bar or less to measure a hydrogen flux. The result is shown in FIG. 3A.

Figure 3A:
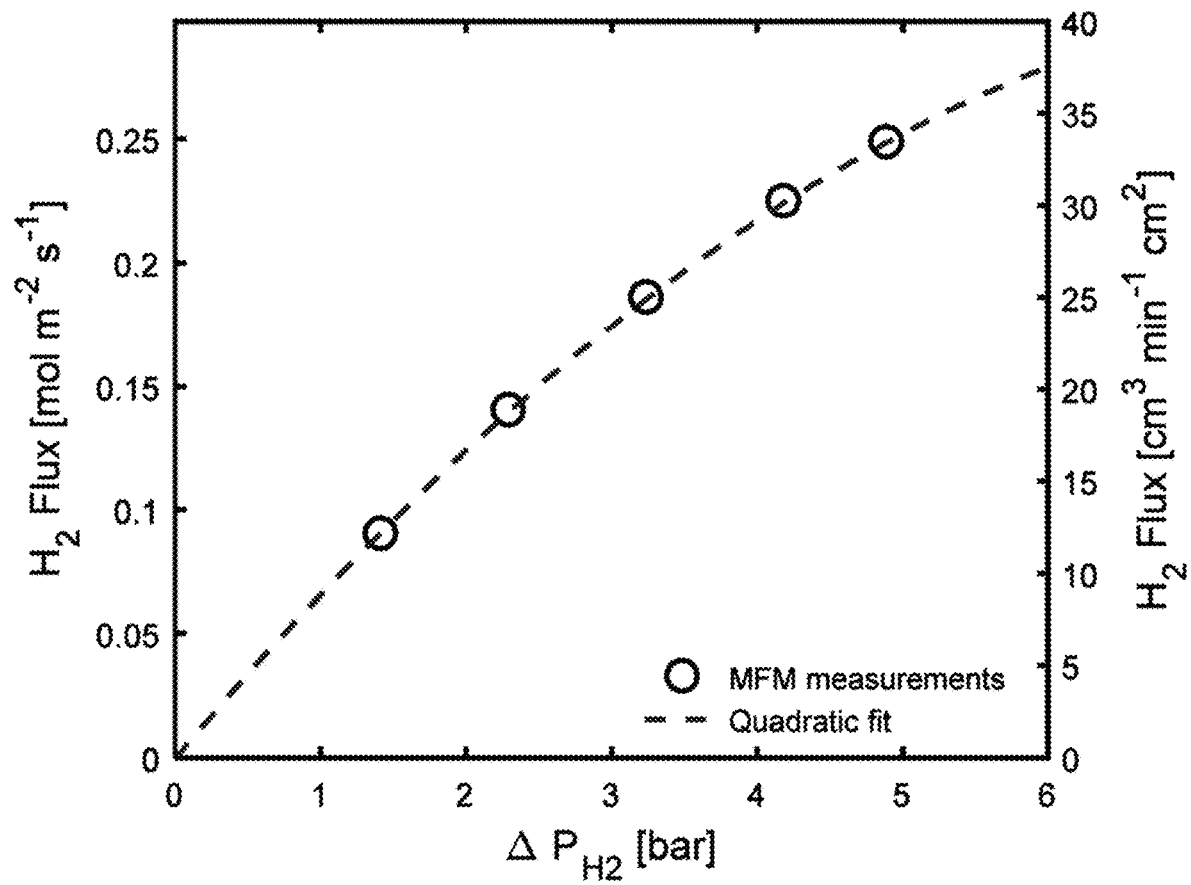
FIG. 3A illustrates a graph showing the hydrogen permeability of the Pd/Ta composite membrane.

Referring to FIG. 3A, it can be verified that the flux of the hydrogen membrane reached 0.25 molm$^{-2}$s$^{-1}$ (33.4 cm$^3$ min$^{-1}$ cm$^2$) at a H$_2$ partial pressure difference of 4.8 bar and 450° C. Herein, 4.8 bar corresponds to the H$_2$ partial pressure difference expected when ammonia supplied at an absolute pressure of 7.5 bar is completely converted into hydrogen.

The hydrogen permeability of the membrane was calculated using Equation 1, as shown below.

$$P = J \frac{t}{\left(p_f^n - p_p^n\right)} \qquad \text{[Equation 1]}$$

wherein P denotes permeability, J denotes a hydrogen flux, t denotes a thickness of the membrane, p$_f$ and p$_p$ denote the hydrogen partial pressures of the reaction region and the permeate region, and n denotes Sievert's pressure exponent (generally, 0.5 in the flow where bulk diffusion is superior).

As the result of calculating the H$_2$ single gas permeability of the membrane using [Equation 1], the permeability of the membrane according to Example 1 was about 1.26×10$^{-7}$ mol$^{-1}$s$^{-1}$ Pa$^{-0.5}$. This permeability is the value which was improved about 5 times than the Pd/Ag membrane or conventional BCC alloy membranes.

Accordingly, it can be confirmed that the hydrogen membrane of the membrane reactor according to Example 1 of the present application has significantly improved $H_2$ gas permeability.

$N_2$ Leakage Test

In addition, the $N_2$ gas leakage tests were conducted at the reaction temperature and room temperature before and after the aforementioned hydrogen permeability test. It was confirmed that the pressure change for 10 minutes was within 1%, by increasing the pressure inside the reactor to 3 bar and blocking all gas passages to the reactor.

As the result, it was confirmed that there was no leakage of $N_2$ gas, and thereby it was verified that the membrane reactor according to Example 1 of the present invention has no mechanical breakdown due to the hydrogen embrittlement in the ranges of the tested pressures and temperatures.

Test Example 2: Catalyst Performance Evaluation According to Temperatures and Pressures After measuring the $NH_3$ concentration with a tunable diode layer ammonia gas analyzer (Airwell+7, KINSCO technology), the $NH_3$ conversion was calculated using the following equation 2.

$$C_{NH_3} = \frac{\dot{V}_{NH_3,unreacted}}{\dot{V}_{ret}} = \frac{\dot{V}_{NH_3,rea} \times (1-x)}{\dot{V}_{NH_3,rea} \times (1+x) + \dot{V}_{N_2,bal} - \dot{V}_{H_2,perm}} \quad \text{[Equation 2]}$$

wherein $C_{NH3}$ denotes the ammonia concentration of the measured remaining gas, x denotes the ammonia conversion, $V_{NH3,rea}$ denotes the flow velocity of the reactant ammonia, $V_{NH3,unreacted}$ denotes the flow velocity of unreacted ammonia, $V_{ret}$ denotes the flow velocity of total remaining gas, $V_{N2,bal}$ denotes the flow velocity of $N_2$ dilution gas, and $V_{H2,perm}$ denotes the flow velocity of the permeated hydrogen, respectively. From the above, the conversion of $NH_3$ can be calculated using Equation 3.

$$NH_3 \text{ Conversion } (\%) = x \times 100 = \frac{\dot{V}_{NH_3,rea} - (\dot{V}_{NH_3,rea} + \dot{V}_{N_2,bal} - \dot{V}_{H_2,perm}) \times C_{NH_3}}{\dot{V}_{NH_3,rea} + \dot{V}_{NH_3,rea} * C_{NH_3}} \times 100 \quad \text{[Equation 3]}$$

Next, in order to evaluate the performance of the pellet catalyst at a high feed pressure, the $NH_3$ conversions were measured by changing the temperatures and pressures.

Figure 3B:
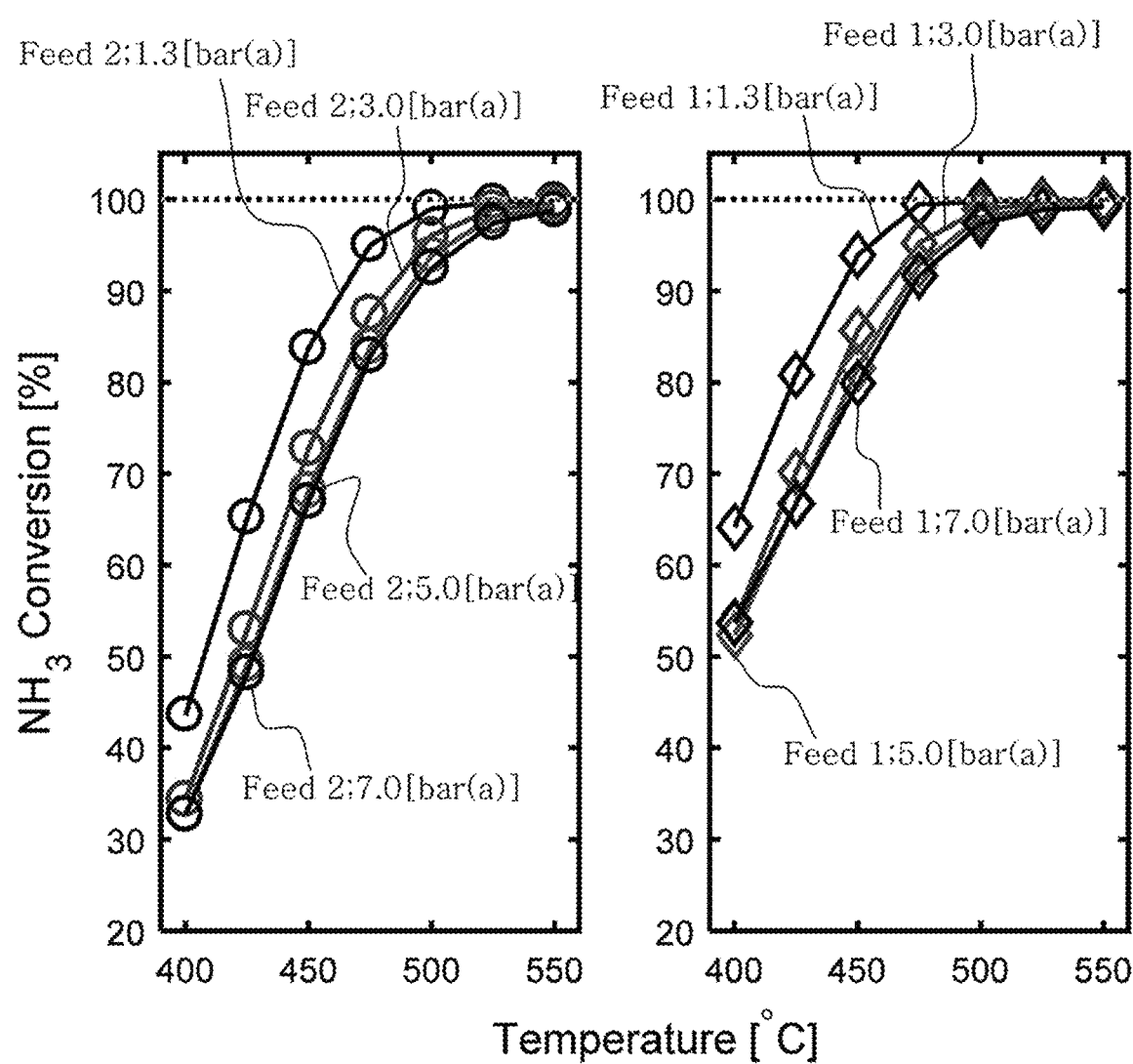
FIG. 3B illustrates graphs showing the ammonia conversions according to the change of the operating temperatures and pressures.

In order to analyze the influence according to the contradiction of the temperature and pressure parameters, the analysis was performed by changing the operation temperatures of the membrane reactor (CMR) according to Example 1 from 400 to 450° C., and increasing the pressure up to an absolute pressure of 1.3-7 bar. The analysis results are shown in the graphs of FIG. 3B. In FIG. 3B, 'Feed 1' and 'Feed 2' mean the ammonia flow rates of 48 cm³ min⁻¹ and 24 min⁻¹ cm⁻², respectively.

As mentioned above, it can be verified that if the pressure is applied to a product, the amount of hydrogen extracted from the membrane is increased, but this gives a negative influence in the decomposition reaction of ammonia.

Test Example 3: Reactor Performance Evaluation According to Temperatures, Pressures and Ammonia Feed Speed The reactor performances of Example 1 (CMR) and Comparative Example 1 (PBR) according to temperatures, pressures and ammonia feed speed were compared and analyzed (refer to FIGS. 4A and 4B).

3-1 Reactor Performance Evaluation According to Temperatures and Pressures

The $NH_3$ conversions in the reactors of Example 1 (CMR) and Comparative Example 1 (PBR) were analyzed at the $NH_3$ feed flow rate of 48 cm³ min⁻¹ at an absolute pressure of 7.5 bar or less and temperatures of 400, 425, and 450° C., respectively.

Figure 4A:
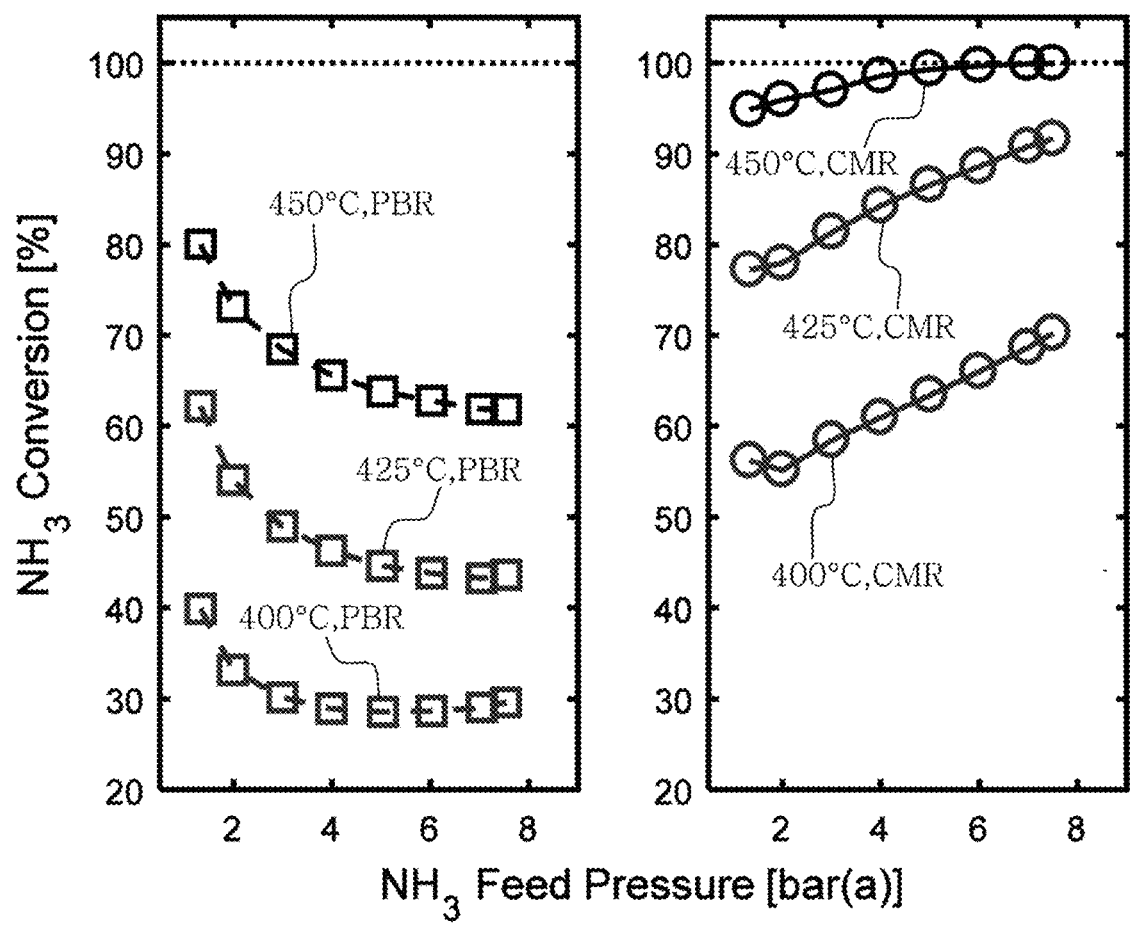
FIG. 4A illustrates graphs showing the comparison of the ammonia conversions according to the pressures of the membrane reactors according to Example 1 and Comparative Example 1.

Referring to the graph shown in FIG. 4A, it can be verified that if the reactor comprises no membrane (Comparison Example 1), as, at 450° C., the ammonia feed pressure increased from 4 bar up to 7.5 bar, the ammonia conversion was significantly reduced from 80% to 66%.

In addition, in the case of the membrane reactor comprising the Pd/Ta membrane (Example 1), as the ammonia decomposition reaction was in progress, while the ammonia feed pressure was a low absolute pressure of 1.3 bar, the conversion was increased up to 97%, and about 64% of the hydrogen decomposed permeated the membrane.

Thus, it is analyzed that the effect resulting from the membrane is obtained when the ammonia conversion is low at a low pressure and a high feed rate. That is, since the $H_2$ partial pressure is already high at a low feed pressure, the conversion improvement is lowered as the feed pressure increases at a high temperature where the $NH_3$ conversion is relatively high.

3-2 Reactor Performance Evaluation According to the Ammonia Feed Rate

The $NH_3$ conversion was analyzed by operating the reactor under the same conditions as those for the reactor performance evaluation according to temperatures and pressures.

Figure 4B:
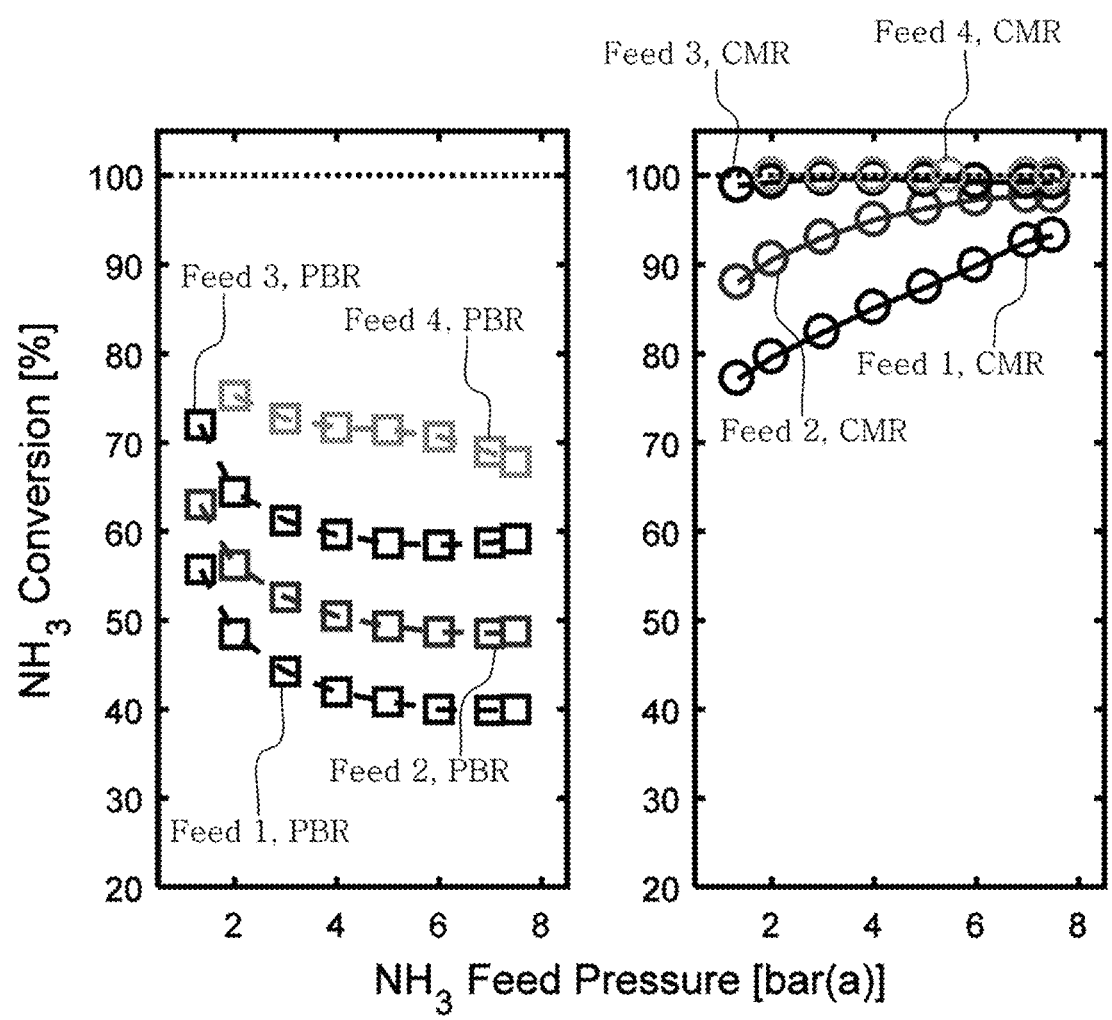
FIG. 4B illustrates graphs showing the comparison of the ammonia conversions according to the ammonia feed flow rates of the membrane reactors according to Example 1 and Comparative Example 1.

As the analysis result, trends similar to the case where temperatures and pressures were changed have been identified for $NH_3$ feed rate variations. The result is shown in FIG. 4B. In FIG. 4B, 'Feed 1' to 'Feed 4' mean the ammonia flow rates of 48 cm³ min⁻¹, 36 cm³ min⁻¹, 24 cm³ min⁻¹, and 12 cm³ min⁻¹, respectively.

As illustrated in FIG. 4B, it can be verified that as the ammonia feed rate is high, the ammonia conversion becomes much higher. In particular, in the case of Feeds 3 and 4, the ammonia conversion was high even at a low pressure, and it was maintained at the similar level even while increasing up to the absolute pressure of 7.5 bar. In the case of Feeds 1 and 2, as the pressure increased, the conversion increased up to about 93%, and then converged. Such convergence is because the gap of the amount of change due to a pressure increase at a low feed rate is much higher than at a feed rate where hydrogen efficiency is high.

Figure 4C:
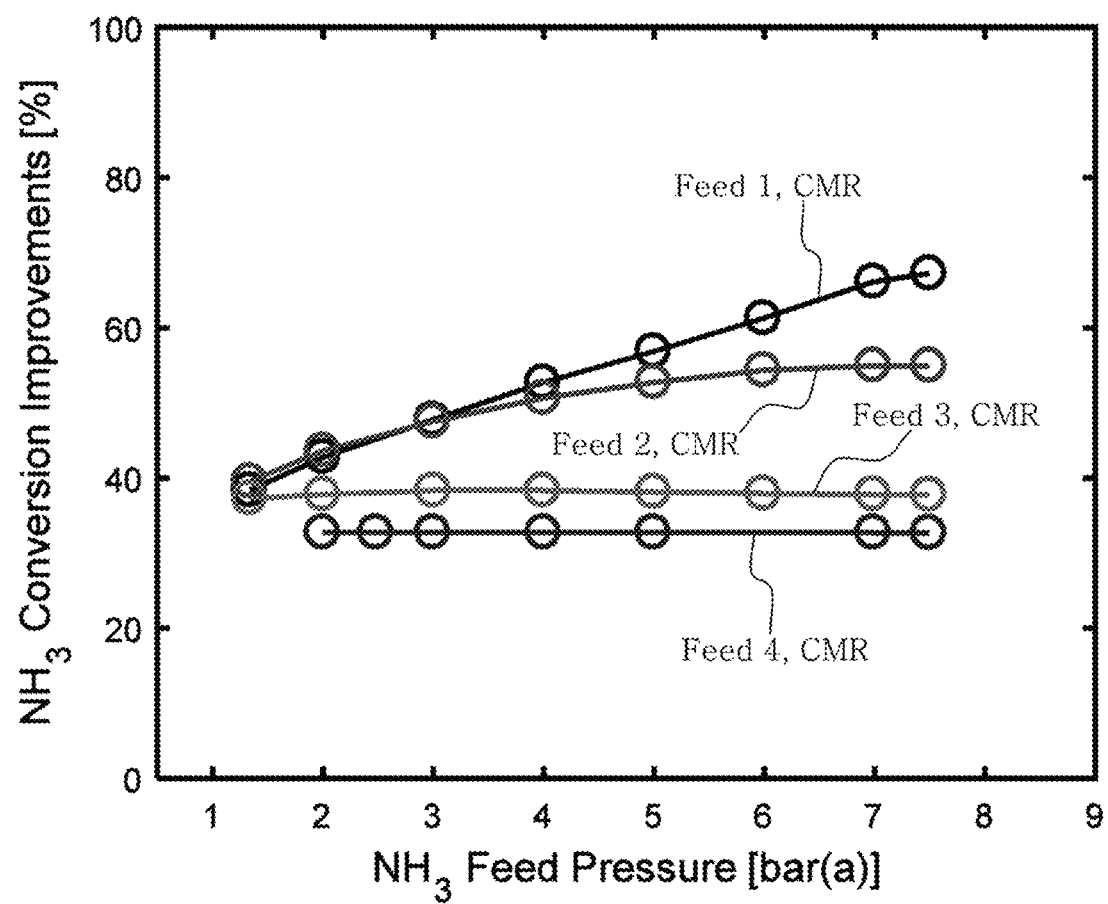
FIG. 4C illustrates a graph showing the increase of the ammonia conversions according to the change of the feed flow rates of ammonia in the membrane reactor according to Example 1 as compared to the membrane reactor according to Comparative Example 1.

In addition, FIG. 4C shows the increase of the ammonia conversions according to the change of the feed flow rates of ammonia in the membrane reactor according to Example 1 as compared to the membrane reactor according to Comparative Example 1. Herein, 'Feed 1' to 'Feed 4' mean the ammonia flow rates of 48 cm³ min⁻¹, 36 cm³ min⁻¹, 24 cm³ min⁻¹, and 12 cm³ min⁻¹, respectively.

Figure 4D:
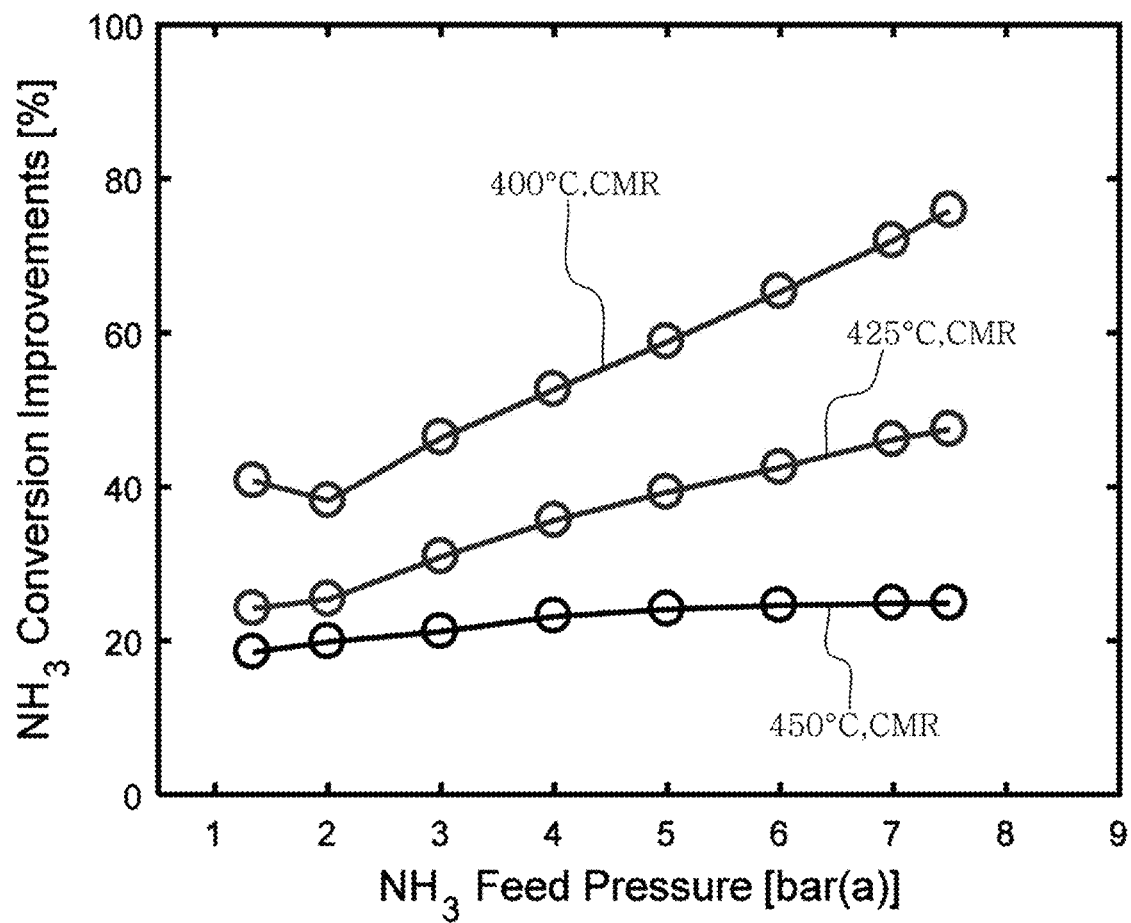
FIG. 4D illustrates a graph showing the increase of the ammonia conversion according to the pressure in the membrane reactor according to Example 1 as compared to the membrane reactor according to Comparative Example 1.
Figure 4E:
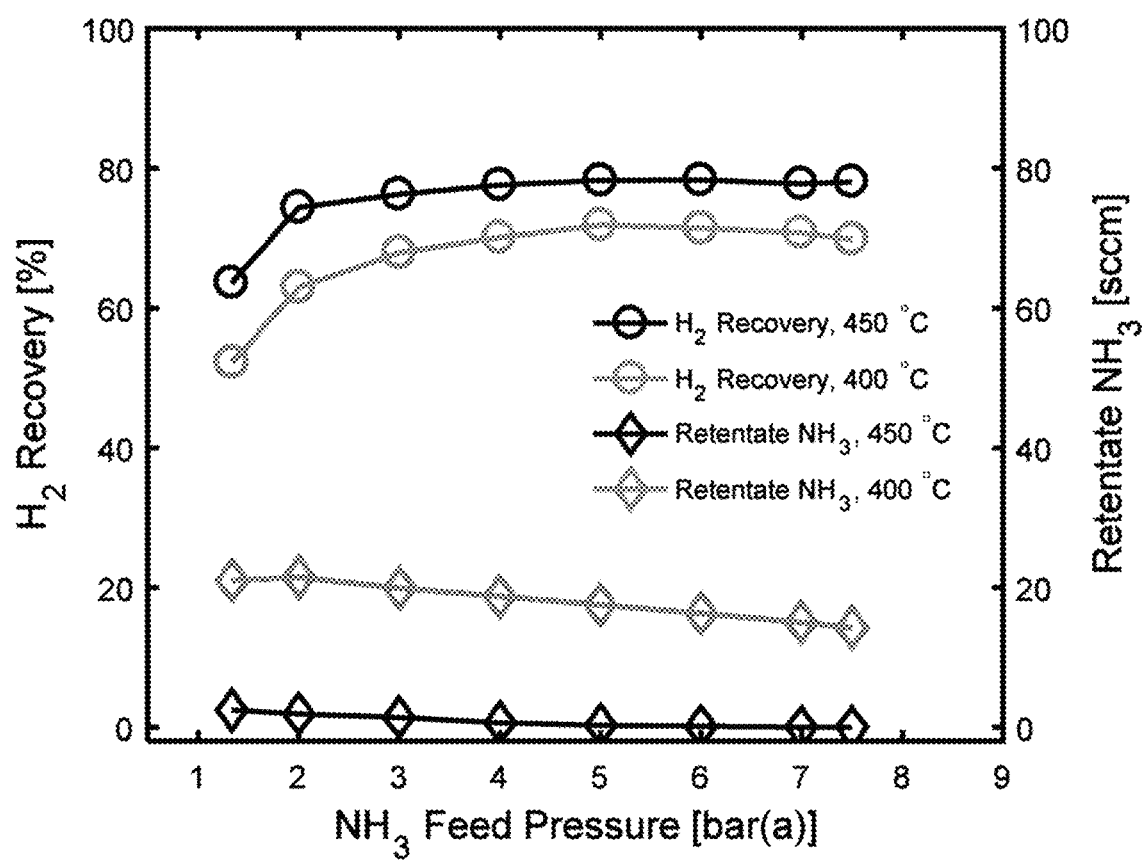
FIG. 4E illustrates a graph showing the hydrogen recovery according to the pressure and the flow rate of unreacted ammonia flowing a reaction region.

Meanwhile, the correlation between hydrogen extraction and conversion can be explained with the $H_2$ recovery. Specifically, the $H_2$ recovery increases with increasing feed pressure and tends to converge to certain thresholds, and this is shown in FIG. 4E. Generally, the $H_2$ recovery is higher if the $NH_3$ conversion is high, i.e. at the point where the $H_2$ partial pressure increases. For example, its threshold is the recovery of about 78% at about 450° C. and about 70% at about 400° C. It was verified that although the threshold of the recovery appears to be slightly lower at 400° C., the increase in hydrogen recovery is about 34% at 400° C., while the increase is about 20% at 450° C., when the feed pressure increases from 1.3 bar to 7.5 bar in relation to the amount of change. This can explain the trend of change in $NH_3$ conversion (refer to FIG. 4D).

Test Example 4: Reactor Performance Evaluation According to the Sweep Gas Supply The reactor performance was evaluated while changing the flow rates of the sweep gas ($N_2$) from 0 to 166 cm$^3$ min$^{-1}$ in the reactor according to Example 1. The reactor was operated at the pressure of 7 bar or more and about 450° C. The hydrogen recovery and $NH_3$ flow rate in the retentate stream were calculated based on the $NH_3$ conversion and the $H_2$ permeate flow rate in the sweep gas, respectively.

Figure 5A:
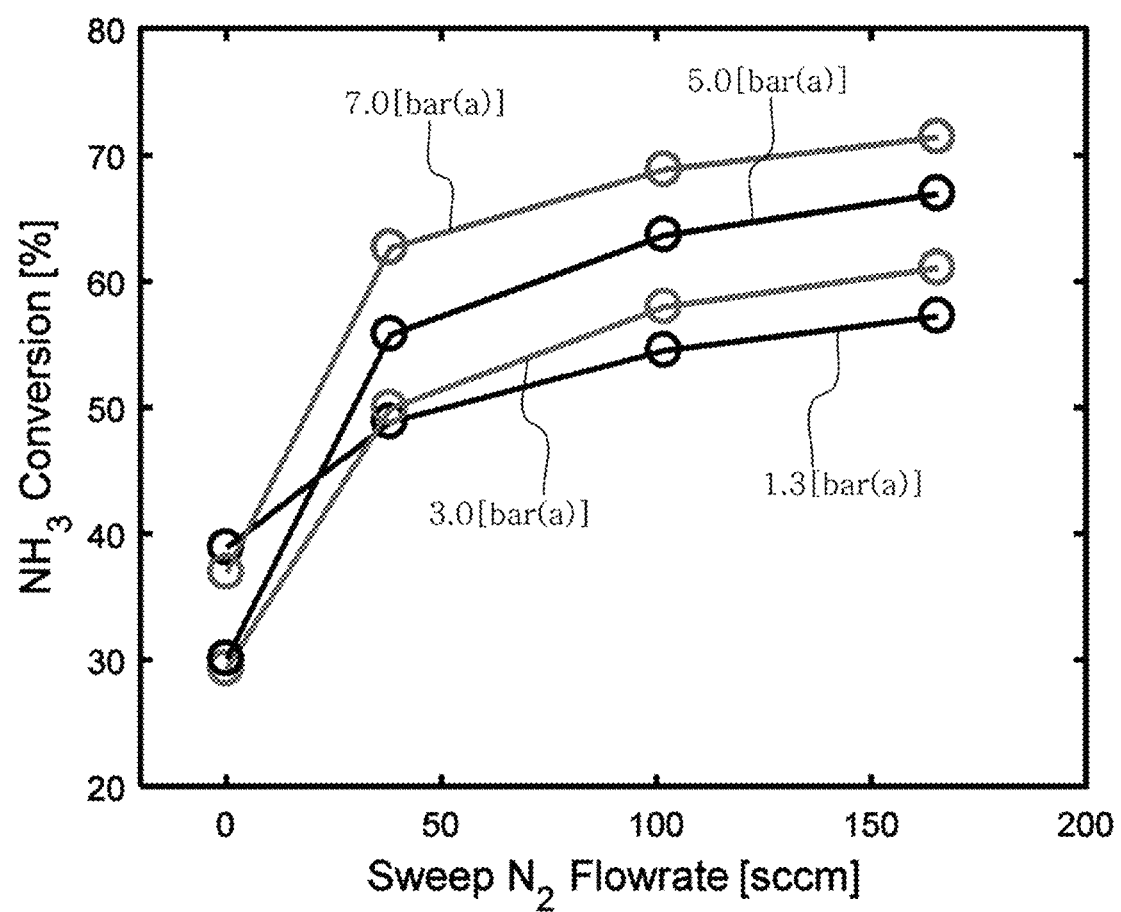
FIG. 5A illustrates a graph showing the ammonia conversion while changing the flow rate of sweep gas at a pressure of 7.0 bar or less.

Referring FIG. 5A which shows the performance evaluation result, it can be verified that the ammonia conversion was sharply increased depending on the presence and absence of the sweep gas. However, it showed that the increase on the ammonia conversion depending on the increase of the sweep gas flow rate is slight.

Figure 5B:
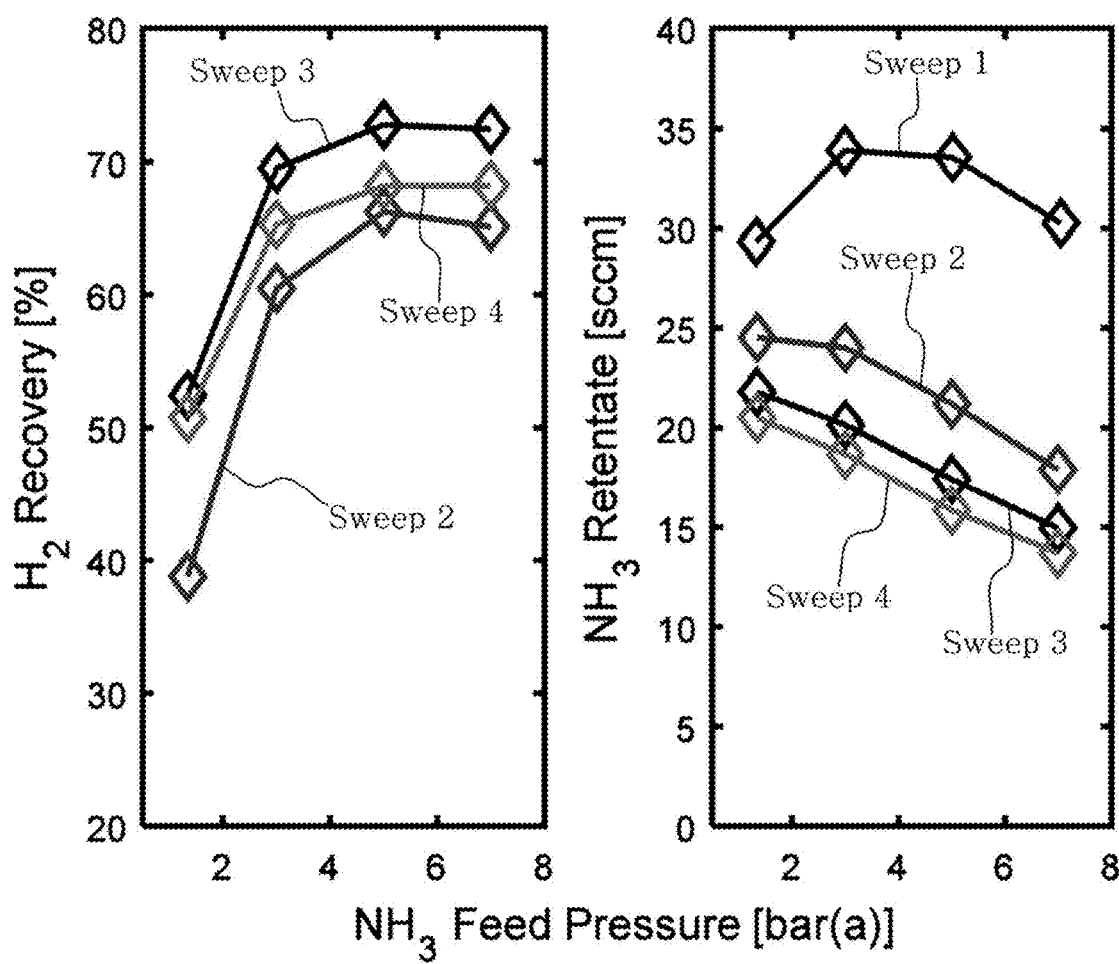
FIG. 5B illustrates graphs showing the hydrogen recovery and the flow rate of unreacted ammonia flowing the reaction region, calculated from the ammonia conversion and hydrogen permeability, while changing the flow rate of the sweep gas.

In addition, referring to FIG. 5B, it was confirmed that due to the sweep gas, in the retentate side, the $H_2$ recovery was increased, while the $NH_3$ concentration was reduced. Herein, the $N_2$ flow rates of Sweeps 1, 2, 3, and 4 were 0, 38, 102, and 166 cm$^3$ min$^{-1}$, respectively.

Figure 5C:
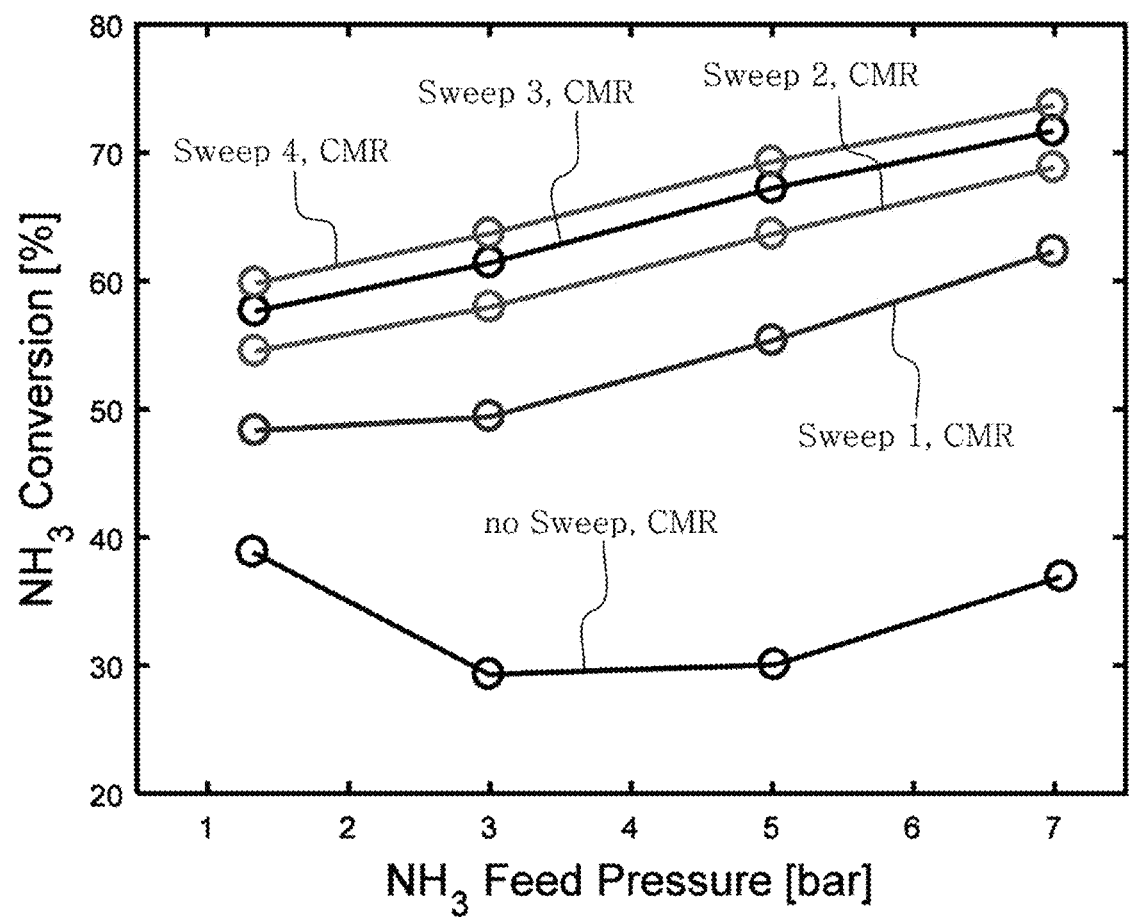
FIG. 5C illustrates a graph showing the ammonia conversion while changing the flow rate of the sweep gas.

Further, referring to FIG. 5C, it was confirmed that as the flow rate of the sweep gas increased, the ammonia conversion increased. Herein, the $N_2$ flow rates of Sweeps 1, 2, 3, and 4 were 0, 38, 102, and 166 cm$^3$ min$^{-1}$, respectively.

Figure 5D:
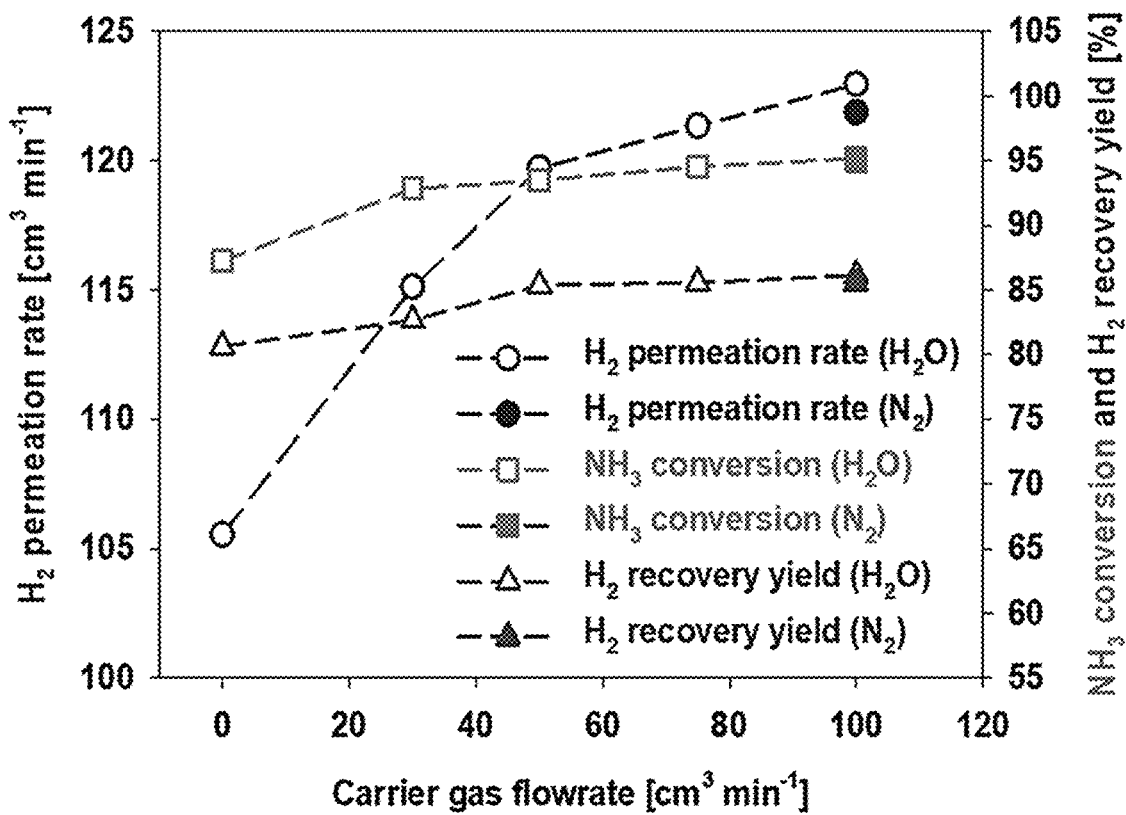
FIG. 5D illustrates a Comparison of performance of membrane reactor when using $N_2$ and $H_2O$ as a sweep gas.

FIG. 5D shows a comparison of performance of membrane reactor when using $N_2$ and $H_2O$ as a sweep gas, showing no significant difference in terms of $H_2$ permeation rate, $H_2$ recovery yield, and $NH_3$ conversion.

Figure 6A:
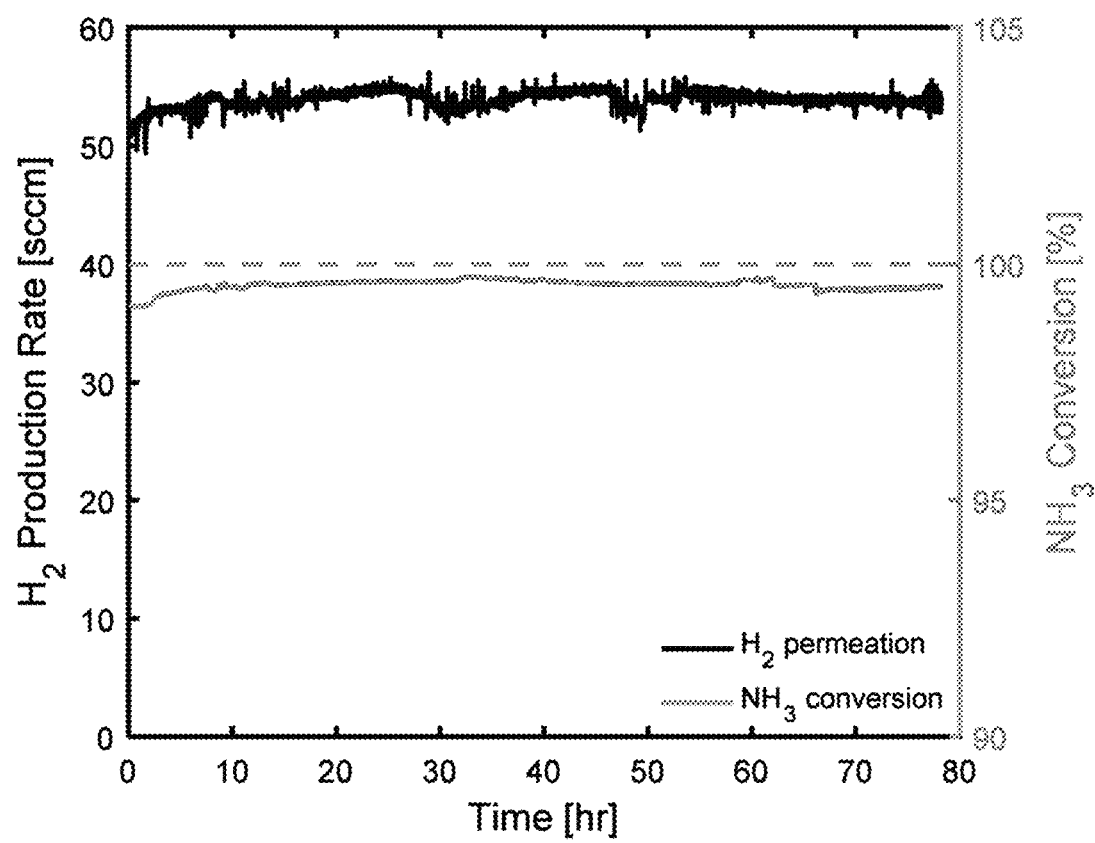
FIG. 6A illustrates a graph showing the flow rate of the produced hydrogen, and the ammonia conversion.

Test Example 5: Reactor Durability Performance Evaluation 5-1 Hydrogen Membrane Durability Test As illustrated in FIG. 6A, in order to test the durability of the hydrogen membrane according to the present invention, the membrane reactor was operated for 78 hours at the $NH_3$ conversion of 99% or more at 7.5 bar before $NH_3$, and 450° C.

As the result of the durability test, it was verified that fouling accelerates at temperatures above 500° C., and fouling can be minimized at below 450° C. This corresponds to the operating conditions of the CMR where the ammonia decomposition process is carried out.

It was verified that the membrane supplies $NH_3$ at the pressure of 7.5 bar, while the hydrogen permeability did not decrease for long periods. In addition, the $NH_3$ conversion rate remained above 99% for 78 hours.

5-2 Test for the Ammonia Amount in a Permeate Stream of the Membrane Reactor

The $NH_3$ concentration in the permeated $H_2$ stream was intermittently measured for about 1 hour, and when confirmed with an analyzer, the concentration was 0 ppm. However, since the detection limit of the analyzer is less than 1 ppm, the amount of $NH_3$ in the permeate stream was further quantified using a Nessler reagent.

Figure 6B:
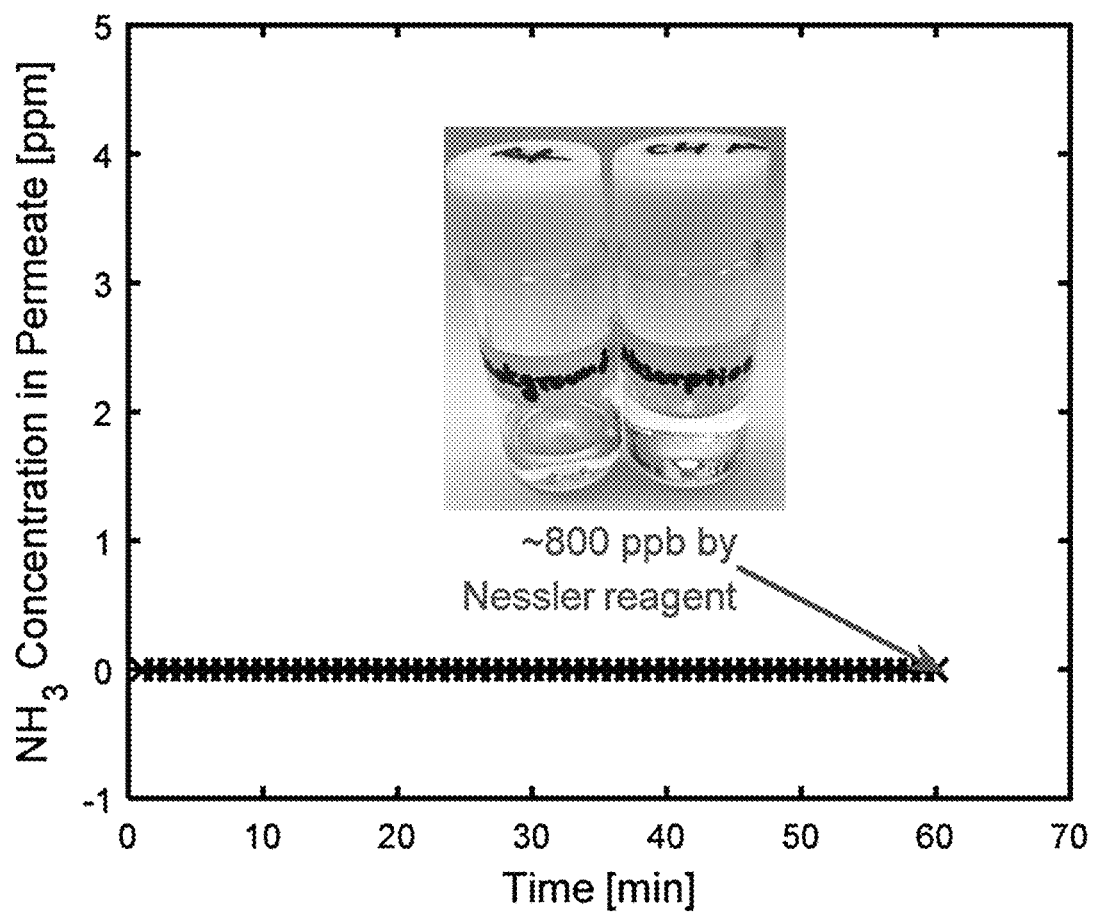
FIG. 6B illustrates a graph showing the ammonia concentration of a permeate region.
Figure 6C:
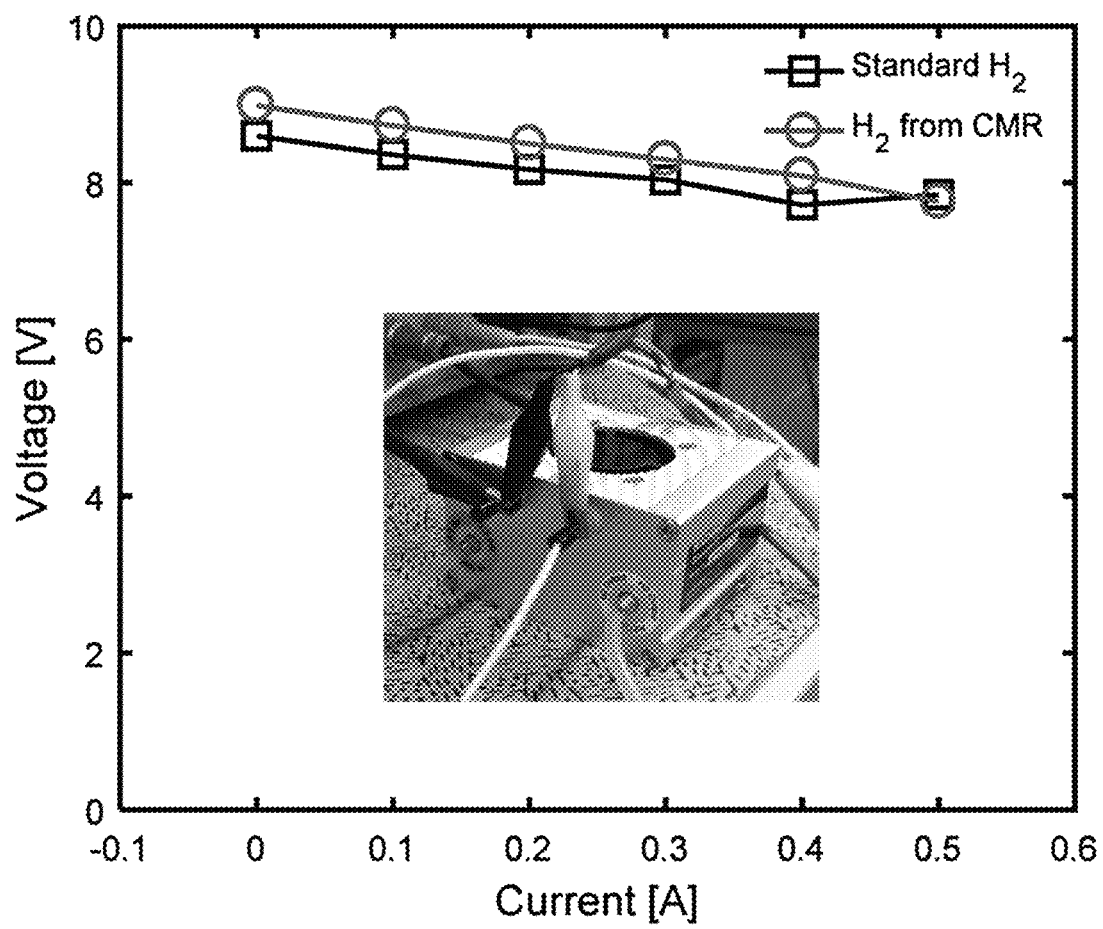
FIG. 6C illustrates a graph showing that when hydrogen having a purity of about 99.999%, emitted from the membrane reactor according to the embodiment of the present invention, is supplied to the PEMFC, no performance deterioration was observed.
Figure 6D:
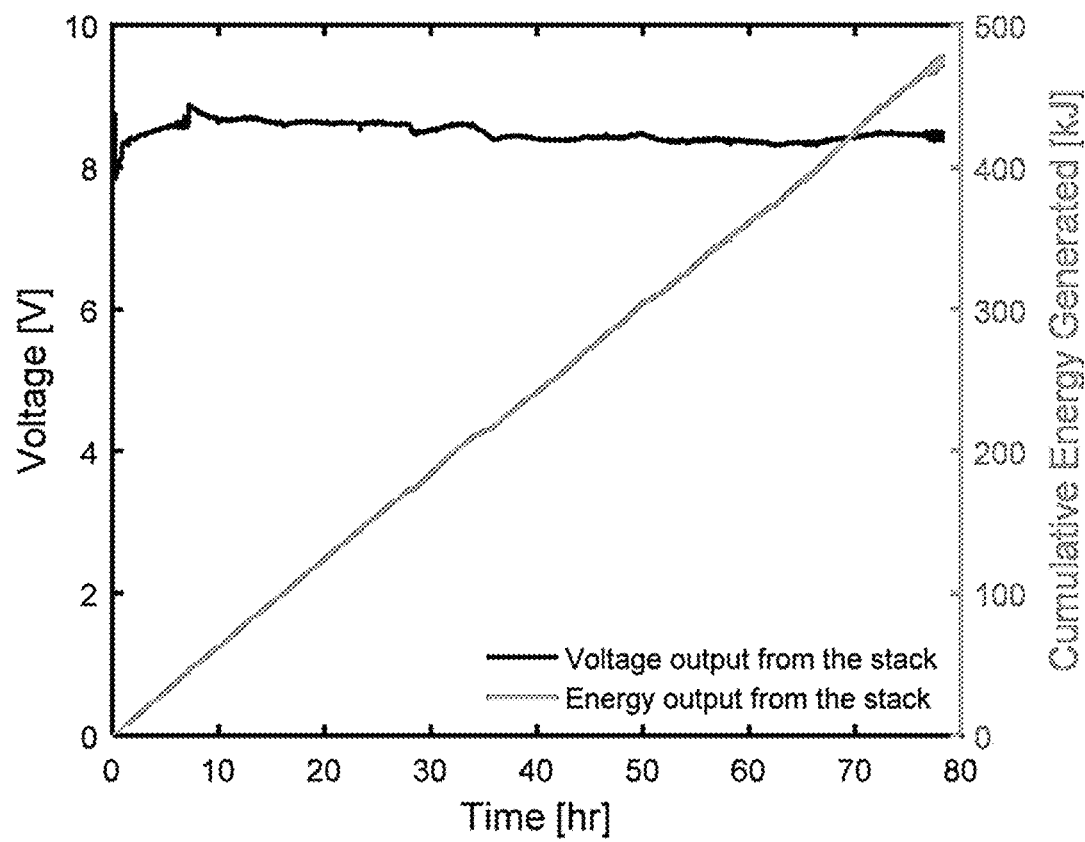
FIG. 6D illustrates a graph showing that when the hydrogen emitted from the membrane reactor according to the embodiment of the present invention is supplied to the PEMFC and used for long periods, no performance deterioration was observed.

For verification, I-V curves were compared by supplying pure $H_2$ and $H_2$ isolated from CMR containing 800 ppb $NH_3$ to (12 W) PEMFC, and it can be seen that the ammonia concentration of about 800 ppb is harmless to the performance of PEMFC (refer to FIGS. 6C and 6D).

In addition, as can be seen from FIG. 6B, it was confirmed that the amount of ammonia in the permeate stream emitted from the reactor was kept at about 800 ppb, and this low concentration of ammonia is harmless because it does not significantly affect the performance of PEMFC.

5-3 Degradation and Fouling Analysis

Meanwhile, the surface and the cross section of the composite membrane before and after the durability test were analyzed to identify signs of deterioration or fouling.

Figure 7A:
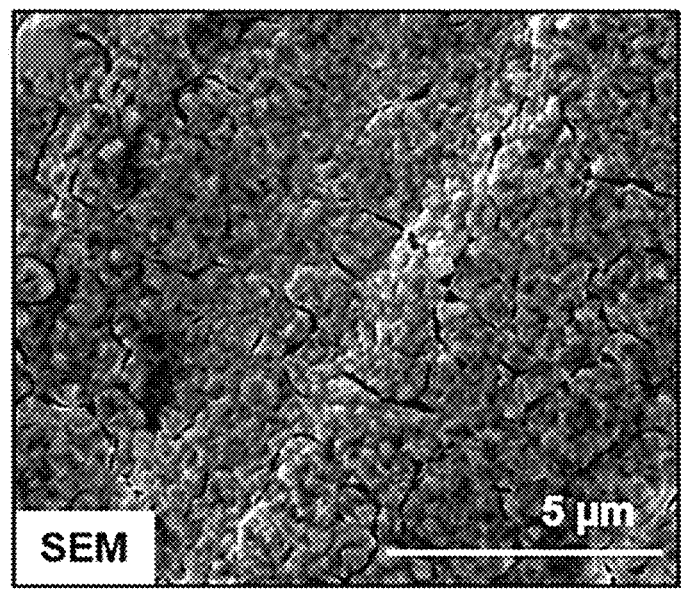
FIG. 7A illustrates SEM images of the Pd layer before (a) and after (b) testing durability, showing the properties of the composite membrane according to the reactor durability performance evaluation.
Figure 7A:
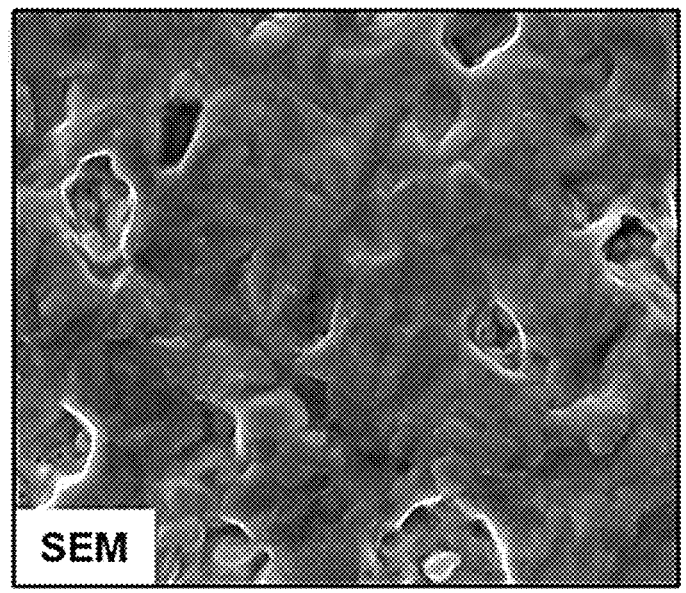

FIG. 7A illustrates SEM images of the respective samples showing the change in the forms of the Pd surface before and after the durability test of the hydrogen membrane. From the images, it can be seen that after the durability test, the Pd surface was smoother and the edges were less sharp, and this change in surface structure shows a similar effect to the heat treatment. On the other hand, a small amount of pores were observed on the Pd surface after the durability test, but it was confirmed that the pores have a significantly smaller pore density than the conventional membrane.

5-4 Pd/Ta Surface Diffusion Analysis

Figure 7B:
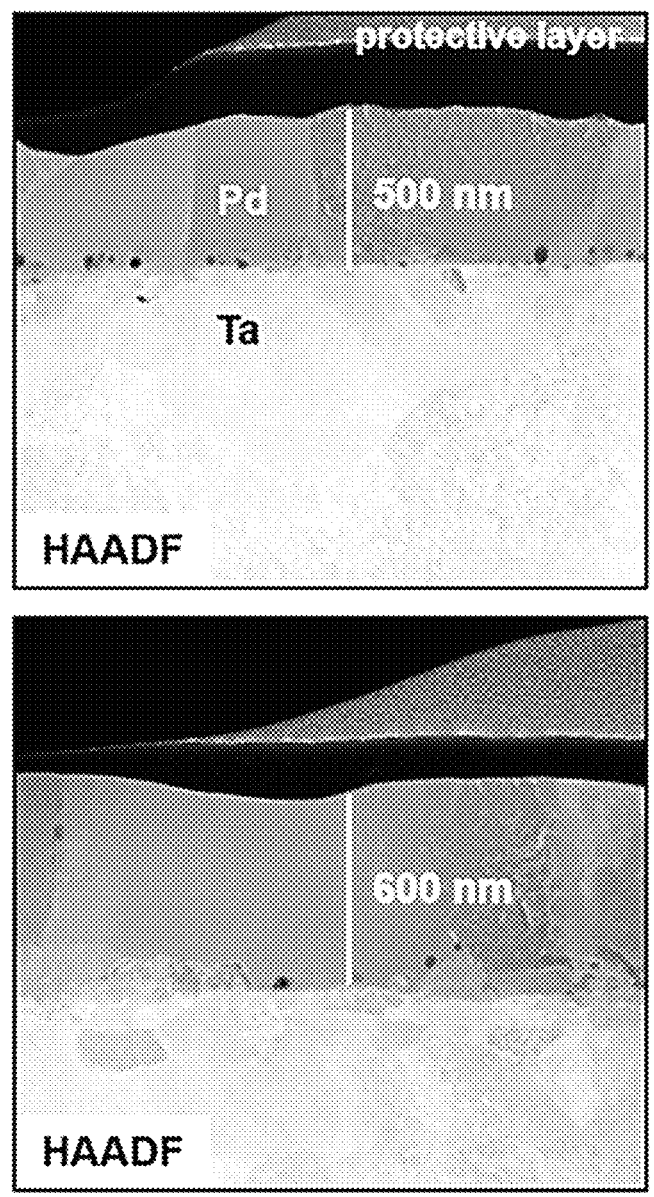
FIG. 7B illustrates whether the diffusion phenomenon occurs on the Pd/Ta surface before (a) and after (b) testing durability, showing the properties of the composite membrane according to the reactor durability performance evaluation.
Figure 7C:
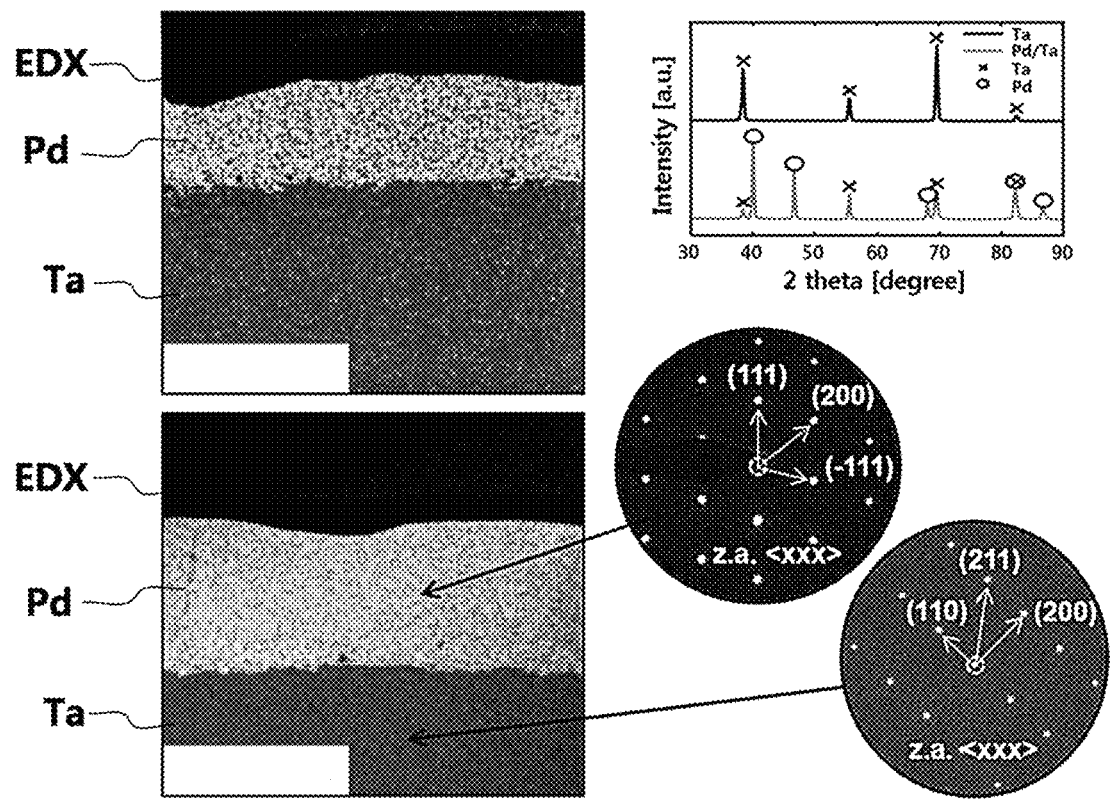
FIG. 7C illustrates the analysis results through XRD (g) and SADP (h) on the alloying sign and crystals of the composite membrane according to the embodiment of the present invention before (a) and after (b) testing durability, showing the properties of the composite membrane according to the reactor durability performance evaluation.

It was confirmed whether diffusion phenomenon occurred on the Pd/Ta surface of the hydrogen membrane after the hydrogen membrane durability test, and specifically, the cross-sectional TEM image was compared to show the diffusion between the Pd layer and the Ta layer of the hydrogen membrane. The analysis result is shown in FIG. 7B.

As the analysis result, it can be confirmed through EDX mapping that even after the durability test, the Pd layer and the Ta layer of the hydrogen membrane form a clearly separated boundary, and thereby no sign of diffusion between the Pd layer and Ta layer was observed even after long periods of operation under the aforementioned reactor operating conditions. Accordingly, it can be seen that the Pd/Ta membrane of the membrane reactor according to Example 1 of the present invention has excellent durability even over long periods of operation.

5-5 XRD and SADP Analysis

After the hydrogen membrane durability test, the alloying sign and crystals of the Pd/Ta membrane of the membrane reactor according to Example 1 were evaluated through the XRD and SADP analysis.

As the analysis result, it can be seen that the Pd layer and the Ta layer of the Pd/Ta membrane maintain the crystal form of the metal, respectively, without any signs of alloying.

Test Example 6: Reactor Durability Performance Evaluation According to the Presence of a Reinforcement Insert The mechanical durability was tested by measuring the pressure at which leakage occurred or broken while increasing the pressure from the atmospheric pressure by 0.5 bar at a temperature of about 350° C. As the result, when using a reinforcement insert, no leaking or cracking was observed until a higher pressure was applied under the same temperature conditions. From this, it can be seen that the mechanical durability of the reactor could be improved when comprising the reinforcing insert.

Figure 8:
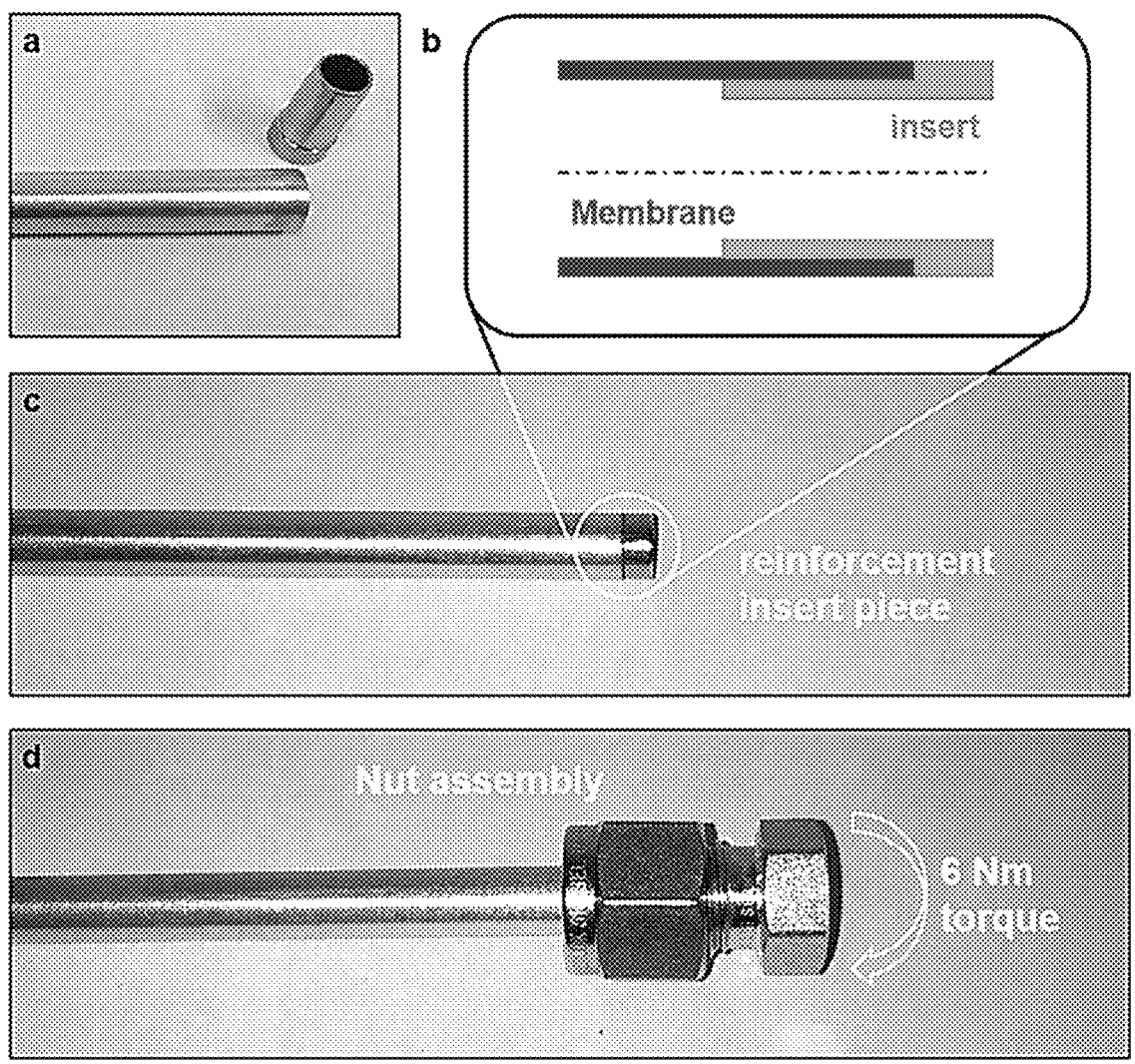
FIG. 8 illustrates a reinforcement insert disposed at an end of the composite membrane of the membrane reactor according to the embodiment of the present invention.

In order to alleviate the stress on the sealing part of the hydrogen membrane, a reinforcing insert (refer to FIG. 8) was installed at the end of the tube, and the mechanical durability was tested.

As the result, it can be seen that the hydrogen membrane operates without mechanical defects even under a high pressure difference and a high temperature of about 350° C. Accordingly, it was confirmed that as the membrane reactor according to the embodiment of the present invention further comprises a sealing part, the membrane reactor has excellent durability.

The membrane reactor according to the embodiment of the present invention can have excellent hydrogen selectivity, and requires no separate ammonia purification device when applied to a fuel cell system, which makes the process step simple.

The membrane reactor according to the embodiment of the present invention can have a higher operating pressure than the ammonia dehydrogenation reaction that is performed at a conventional atmospheric pressure (1 bar), so that it can have high hydrogen conversion although the volume of the reactor is small.

The membrane reactor according to the embodiment of the present invention can have excellent durability without any hydrogen embrittlement problem of the hydrogen membrane even at a low operating temperature.

While the present invention has been described with respect to the specific embodiments, it will be apparent to those skilled in the art that various changes and modifications may be made without departing from the spirit and scope of the invention as defined in the following claims.

What is claimed is:
1. A method of processing ammonia comprising:
   flowing ammonia into a reactor comprising a reaction region; a permeate region; and a composite membrane disposed at a boundary of the reaction region and the permeate region,
   wherein the reaction region comprises a bed filled with a dehydrogenation catalyst for dehydrogenation reaction,
   wherein the dehydrogenation catalyst includes ruthenium carried on a rubidium-doped porous support,
   wherein the composite membrane comprises a support layer including a metal with a body-centered-cubic crystal structure, and a catalyst layer including a palladium (Pd) or a palladium alloy disposed on the support layer,
   wherein the metal with the body-centered-cubic crystal structure includes one or more of vanadium (V), niobium (Nb), or tantalum (Ta), and a surface of the support layer is in contact with the reaction region and a surface of the catalyst layer is in contact with the permeate region,
   converting the ammonia into hydrogen ($H_2$) by the dehydrogenation reaction in the presence of the dehydrogenation catalyst, and
   separating the hydrogen using the composite membrane with the hydrogen entering the permeate region.

2. The method of processing ammonia according to claim 1, comprising supplying sweep gas to the permeate region of the reactor.

3. The method of processing ammonia according to claim 2, wherein the sweep gas is supplied at a flow rate of less than 50% of a volumetric flow rate of the hydrogen emitted from the reactor through the permeate region.

4. The method according to claim 1, wherein the support layer includes an oxide with catalytic activity and the oxide includes one or more of $V_2O_5$, $Ta_2O_5$, or $Nb_2O_5$.

5. The method according to claim 1, wherein the catalyst layer has a thickness of 0.1 μm to 5 μm.

6. The method according to claim 1, wherein the composite membrane has hydrogen permeability of $2\times10^{-8}$ mol $m^{-1}$ $s^{-1}$ $Pa^{-0.5}$ to $3\times10^{-7}$ mol $m^{-1}$ $s^{-1}$ $Pa^{-0.5}$.

7. The method according to claim 1, wherein the porous support comprises one or more selected from the group consisting of $Al_2O_3$, $SiO_2$, $TiO_2$, $CeO_2$, CuO, MgO, $Nb_2O_5$, $WO_3$, $ZrO_2$, FeO, $La_2O_3$, Activated Carbon, Graphene, and hexagonal Boron nitrides.

8. The method according to claim 1, wherein the dehydrogenation catalyst is impregnated with ruthenium in the amount of 0.1 wt. % to 10.0 wt. %, with respect to a total weight of the metal-doped porous support.

9. The method according to claim 1, wherein the porous support includes one or more selected from the group consisting of X zeolite, Y zeolite, ZSM-5 zeolite, beta zeolite, L zeolite, and A zeolite.

10. The method according to claim 9, wherein the dehydrogenation catalyst is impregnated with the ruthenium in an amount of 1 wt. % to 7 wt. %, with respect to a total weight of the metal-doped porous support.

11. The method according to claim 1, wherein a purity of hydrogen emitted from the reactor is 99.999% or more.

12. The method according to claim 1, wherein an operating temperature of the reactor is 350 to 550° C.

13. The method according to claim 1, comprising:
   directly supplying hydrogen emitted from the reactor to a fuel cell.

14. The method according to claim 1, wherein a reinforcement insert is disposed at an end of the composite membrane to prevent material failure by embrittlement, and the membrane reactor overlaps a portion of the reinforcement insert, wherein the reinforcement insert is a sealing part that seals the composite membrane.

15. The method according to claim 1, wherein a dopant metal of the rubidium-doped porous support comprises lanthanum, the lanthanum acting as a Lewis acid site to facilitate absorption of the ammonia to promote the dehydrogenation reaction, wherein the lanthanum increases an activity of the catalyst due to an increase in electron density caused by an electronic interaction between the ruthenium and the lanthanum.

16. The method according to claim 15, wherein the lanthanum is doped at 1 mol % to 20 mol % with respect to the porous support, and the dehydrogenation catalyst is a pellet-type catalyst.

17. The method according to claim 16, wherein the pellet-type catalyst has (i) a surface area of 10 $m^2$ $g^{-1}$ to 200 $m^2$ $g^{-1}$, (ii) a pore size of 0.1 $cm^3$ $g^{-1}$ to 1.0 $cm^3$ $g^{-1}$, and (iii) a pore diameter of 100 Å 200 Å.

* * * * *